United States Patent [19]
Klein

[11] Patent Number: 5,735,668
[45] Date of Patent: Apr. 7, 1998

[54] AXIAL BEARING HAVING INDEPENDENT PADS FOR A CENTRIFUGAL PUMP

[75] Inventor: Manfred P. Klein, Highland Park, Ill.

[73] Assignee: Ansimag Inc., Elk Grove Village, Ill.

[21] Appl. No.: 645,177

[22] Filed: May 13, 1996

Related U.S. Application Data

[63] Continuation-in-part of Ser. No. 610,351, Mar. 4, 1996, abandoned.

[51] Int. Cl.$^6$ .................. F04D 29/04; F04D 29/16
[52] U.S. Cl. .................. 415/172.1; 415/170.1; 415/173.6; 384/122; 384/124
[58] Field of Search .................. 415/110, 170.1, 415/172.1, 173.6; 384/121, 122, 123, 124, 125, 303, 306, 308, 420

[56] References Cited

U.S. PATENT DOCUMENTS

| | | |
|---|---|---|
| 3,730,641 | 5/1973 | Gordon. |
| 3,953,150 | 4/1976 | Onal. |
| 4,065,232 | 12/1977 | Stratienko. |
| 4,073,606 | 2/1978 | Eller. |
| 4,126,360 | 11/1978 | Miller et al. ........... 415/172.1 |
| 4,259,043 | 3/1981 | Hidden et al.. |
| 4,515,486 | 5/1985 | Ide ........................ 384/122 |
| 4,782,696 | 11/1988 | Suchoza et al.. |
| 4,802,818 | 2/1989 | Wiggins et al.. |
| 4,854,745 | 8/1989 | Kamimura et al. ......... 384/124 |
| 5,125,754 | 6/1992 | Ide ........................ 384/122 |
| 5,253,939 | 10/1993 | Hall ....................... 384/123 |
| 5,255,984 | 10/1993 | Ide. |
| 5,302,091 | 4/1994 | Horiuchi. |
| 5,399,024 | 3/1995 | Shapiro ................... 384/124 |
| 5,503,479 | 4/1996 | Ide ........................ 384/122 |

FOREIGN PATENT DOCUMENTS

| | | | |
|---|---|---|---|
| 162050 | 11/1954 | Australia ............ 415/172.1 |
| 94/07043 | 3/1994 | WIPO ................ 384/121 |

*Primary Examiner*—Christopher Verdier
*Attorney, Agent, or Firm*—Darin E. Bartholomew

[57] ABSTRACT

An axial bearing includes a ring, pads and a base. Multiple, independent pads are orientated in a curved or circular configuration with respect to one another. The pads are retained by recesses in the base. If the pump is installed in a centrifugal pump, the base is preferably integrated into a front impeller shroud. Each pad conforms in shape and size to a corresponding recess's shape and size. Each pad has a side which faces a face of the ring. Axial clearances between the base and the pads may be controlled by varying the pad heights. Fractured pads can potentially be retained in the recesses. The user may remove individual pads during repair and inspection of the axial bearing.

62 Claims, 19 Drawing Sheets

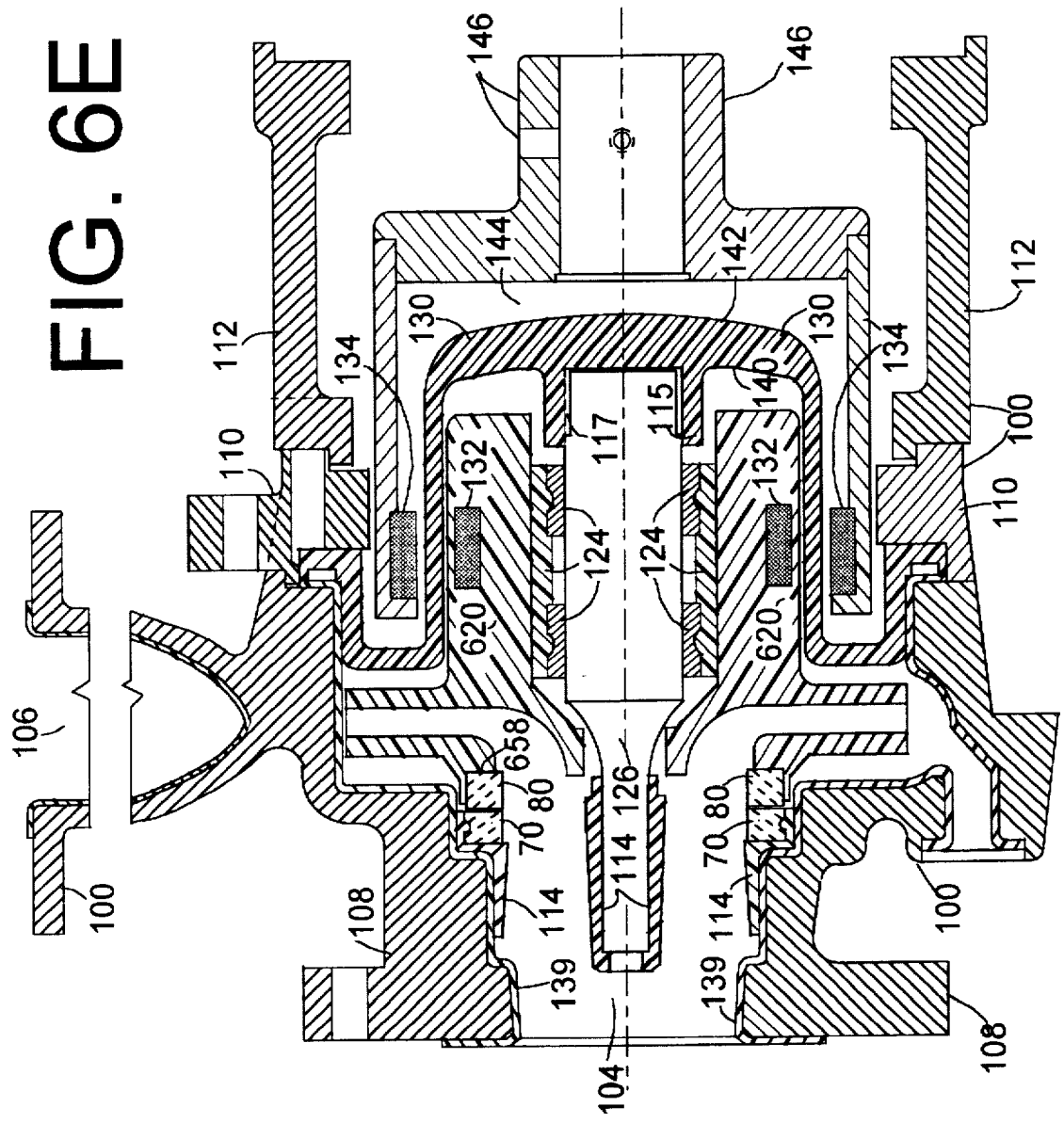

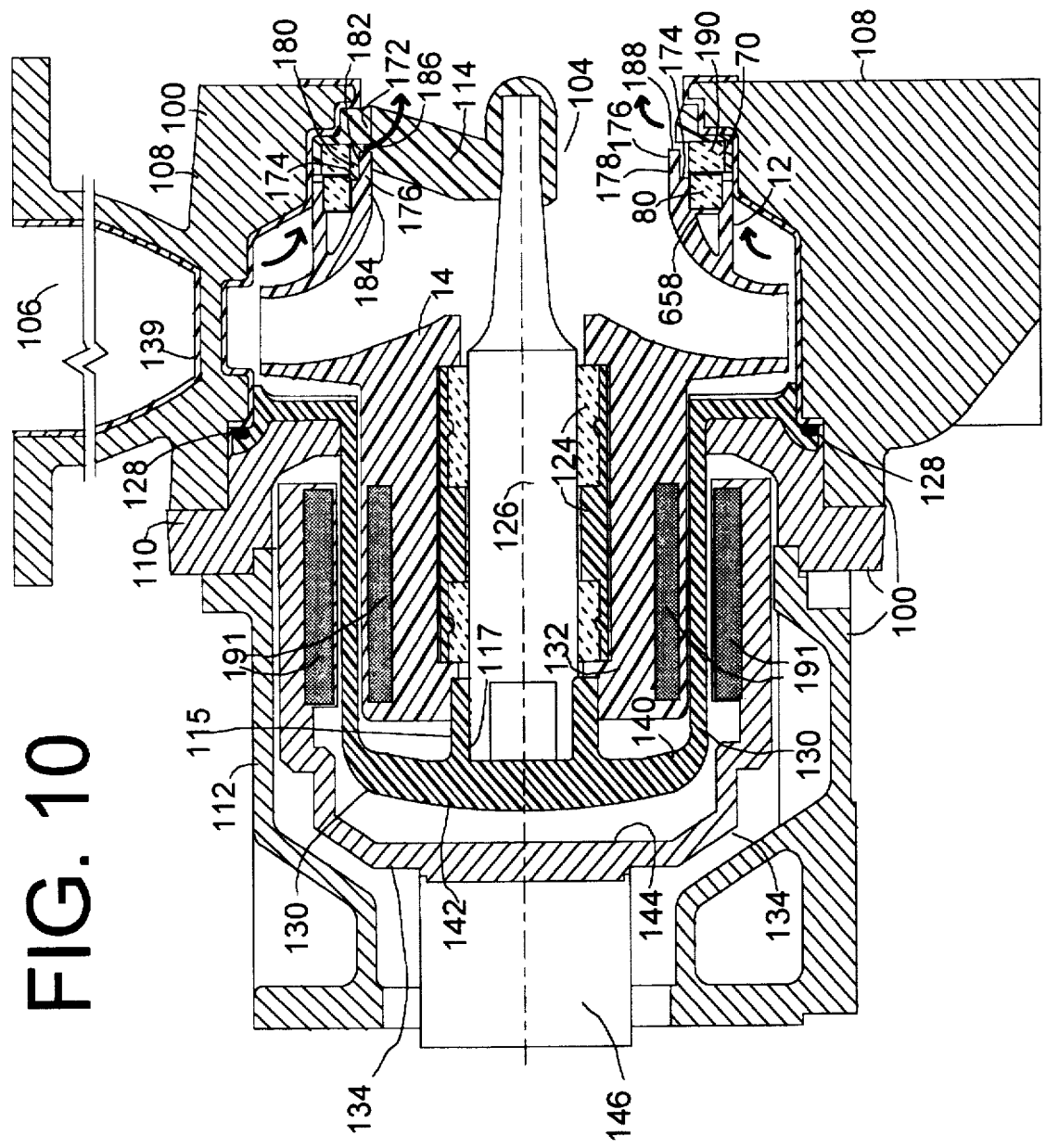

AXIAL BEARING HAVING INDEPENDENT PADS FOR A CENTRIFUGAL PUMP

This is a continuation-in-part of U.S. patent application Ser. No. 08/610,351, filed on Mar. 4, 1996, now abandoned.

FIELD OF THE INVENTION

The present invention relates generally to an axial bearing for use in a centrifugal pump. Particularly, the present invention relates to an axial bearing-wear ring having multiple, independent pads for use in a centrifugal magnetic-drive pump.

BACKGROUND ART

In a centrifugal pump with a single-suction impeller, axial bearings are often placed along the shaft in front of the impeller to compensate for axial force imbalances. Axial force imbalances are caused by fluid pressure differentials within the pump. For example, the discharge fluid pressure near the back shroud of the impeller may exceed the fluid pressure near the front shroud of the impeller. Discharge fluid pressure, which acts on a greater back shroud surface area than a front shroud surface area, partially contributes to the axial force imbalances. As a result, the impeller is forced forward toward the fluid intake region during normal operation.

Axial bearings for centrifugal pumps typically have a stationary thrust ring and a rotatable thrust ring. The rings rotate relative to one another. Axial bearings may be lubricated by pumped fluid (i.e. product lubricated). The axial bearings are constructed from a ceramic, metal, or plastic material. The material selected defines the wearing characteristics of the bearing. For example, a plastic thrust ring operating with a corresponding ceramic thrust ring generally wears more quickly than the ceramic ring.

Axial bearings should be distinguished from wear rings. Wear rings are typically positioned at a leakage joint between the impeller and the casing. The wear rings limit the flow of fluid from the fluid discharge region to the fluid intake region (i.e. suction head). Consequently, appropriate clearance between the wear rings influences the efficiency of the pump.

Wear rings differ in construction from axial bearings. Wear rings are designed based upon factors such as the pumped fluid viscosity and the pressure differential across the leakage joint. Wear rings often have various combinations of radial and axial wearing surfaces. Wear rings in the prior art have increased the length of radial portions of leakage joints to reduce the fluid flow through the leakage joint. Wear rings in the prior art have also used labyrinths with chambers to reduce fluid flow through the leakage joint. An axial bearing that adequately performs the dual functions of a wear ring and an axial bearing could result in cost savings in centrifugal pumps.

Angular alignment refers to a condition where the faces of two axial bearing rings are not entirely parallel. When pumps are manufactured, variations in tolerances may cause the axial bearings to be angularly misaligned. For example, tolerances of the housings and shaft supports may cumulatively cause slight angular misalignment. In addition, angular misalignment may be caused by radial runout of a pump shaft. If the angular misalignment is severe enough, the softer thrust ring of the two thrust rings may wear unevenly. Uneven wear of the softer thrust ring promotes axial bearing failure where the wear decreases the effectiveness of radial lubrication channels in the ring. The reduction in the depth of lubrication channels in the ring may destroy adequate thin-film lubrication and/or cooling of the bearing.

Bearing manufacturers have tried to compensate for angular misalignment by changing the material composition of the axial bearing to ceramic construction. Ceramic construction can increase the design load of the axial bearing. However, even with upgraded bearing material, frictional heat may cause thermal distortion damage to the bearing faces. For example, where tungsten carbide and silicon carbide rings are used together in a single axial bearing, exposure to angular misalignment and poor fluid lubrication can cause heat checking of the tungsten carbide. Heat checking is caused from rapidly heated, localized hot spots on the bearing face which are subsequently, quickly cooled by the lubricating fluid. Therefore, a need exists for a ring with improved frictional characteristics and longevity despite angular misalignment.

Background-art axial bearings for magnetic-drive pumps are typically constructed as continuous rings with substantially uniform cross-sections. When the continuous rings exceed a certain threshold size, background-art axial bearings may present reliability problems. For example, when plastic rings are greater than approximately two and one-half inches in radius, the plastic bearing rings may be difficult to fabricate without internal faults or voids. Faults or voids make the bearings susceptible to stress damage.

Ceramic bearings also present assembly problems when they exceed a certain threshold size. For example, when ceramic rings are greater than approximately two and one-half inches in radius, the ceramic rings tend to break upon insertion into annular retaining recesses during the assembly process. Field technicians tend to break large axial bearing rings when replacing worn axial bearings in the field. Therefore, a need exists for an axial bearing which is easier to manufacture and to assemble than prior art axial bearings.

Another reliability problem for background-art axial bearings occurs during operation of the pump. If the impeller presents severe axial loads and vibration to large ceramic thrust bearings, the thrust bearings can shatter and cause catastrophic failure of the pump.

Background art axial bearings include tilting pad bearings, such as Kingsbury thrust bearings, which are illustrated in *Mark's Standard Handbook for Mechanical Engineers*, by Eugene A. Availone and Theodore Baumeister III,(9th Ed. 1987) at page 8-126. Kingsbury bearings include leveling or equalizing plates located in a base ring. The equalizing plates are connected to a pivot connection, such as a stud. In turn, the pivot connection attaches bearing shoes to each equalizing plate. The Kingsbury bearing is an elaborate bearing which is expensive to manufacture when compared to simple axial thrust rings. The Kingsbury bearing of traditional metal construction is not suitable for contact with caustic chemicals. Therefore, a need exists for an improved axial thrust bearing with manufacturing costs comparable to simple axial thrust rings.

SUMMARY OF THE INVENTION

The axial bearing of the present invention includes a ring, pads and a base. Multiple, independent pads are orientated in a curved or circular configuration with respect to one another. The pads are retained by recesses in the base. Each pad conforms in shape and size to a corresponding recess's shape and size. The pads have sides which face a face of the ring. The pads are preferably tapered in axial height to increase the circulation of cooling and lubricating fluid between the pads and the face.

If appropriately positioned in a centrifugal pump, the axial bearing of the present invention can perform both the functions of an axial bearing and a wear ring. The axial bearing is preferably installed between the front of the impeller and the housing. The recesses are located in a front shroud of the impeller so that the need for a separate base is obviated. In other words, the base may be integrated into the impeller itself. The impeller is optimally made from a plastic or polymer that can flex during operation to dampen axial load changes.

When the axial bearing is used as a wear ring, a leakage joint is formed between the pads and the ring. The leakage joint limits the flow of fluid from the pump discharge region to the intake region. To keep flow through the leakage joint to a minimum, the pads and the ring are made from ceramics and/or PTFE so sliding contact may occur. If other materials are used for the pads and the ring, the pads need to be separated from the ring by a lubricating film. To further increase the performance of the axial bearing as a wear ring, the axial shroud extension is optionally added to the front shroud of the impeller.

Each pad is optimally placed in a recess or pocket that can potentially retain an individual, broken pad. If a pad breaks during operation of the pump, the broken pad is retained within an isolated pocket or recess region while the other pads can often continue to function normally. In practice, whether or not the broken pad is adequately retained depends upon the number of pad fractures among other factors. The recess may be lined with a resilient member to avoid damage to the face when operating with a broken pad. The resilient member compensates for angular misalignment.

The pads are retained in recesses in the base which allows the pads to be readily removed during repair and replacement of the axial bearing. Each recess has a first interlocking cross section. The first interlocking cross section corresponds in size and shape to a second interlocking cross section of any pad. The first interlocking cross sections and the second interlocking cross sections are united to frictionally retain the pads in the recesses.

The peripheral surface of the pads are prevented from radial movement and rotational movement by the recesses. The walls of the recess prevent radial and rotational movement. While the frictional retention of the pads may be accomplished by a press-fit, the clearances between the pads and recess are preferably such that the pads are readily removable from the base during repair and inspection of the axial bearing.

Each pad is individually placed in a corresponding recess, reducing the amount of force necessary to assemble an axial bearing in comparison to certain axial bearings of the background art. The efficiency of the pump manufacturing process is increased by reducing delays from broken axial bearing rings. In addition, repair and disassembly of pumps in the field is simplified through use of the axial bearing of the present invention.

BRIEF DESCRIPTION OF THE DRAWINGS

FIG. 6E shows a cross-sectional view of the entire centrifugal magnetic-drive pump incorporating the first embodiment of the axial bearing-wear ring.

FIG. 10 shows a cross-sectional view of an axial bearing-wear ring of the present invention in conjunction with a shroud extension extending from the front of the impeller.

DETAILED DESCRIPTION OF THE PREFERRED EMBODIMENTS

Axial Bearing

Figure 1A:
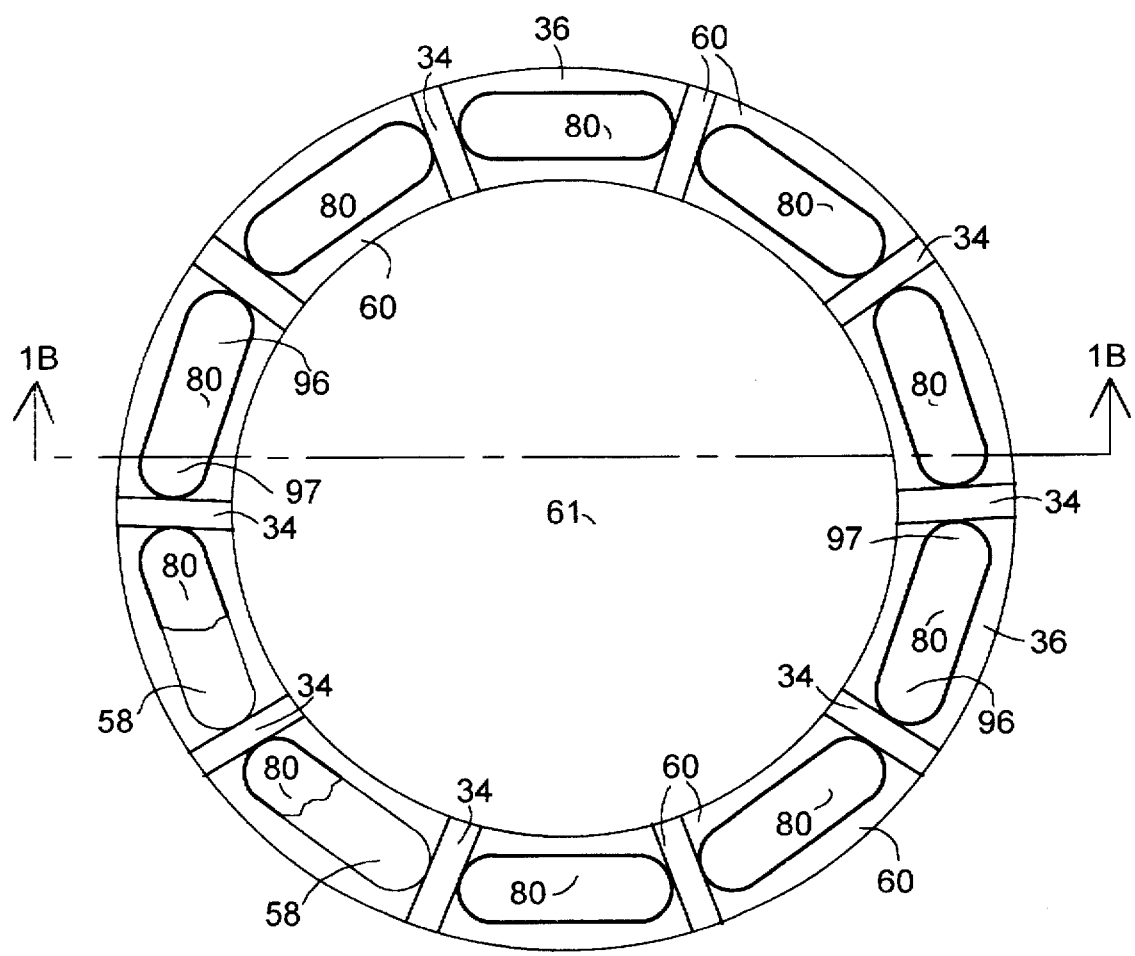
FIG. 1A is a top plan view of a first embodiment of the axial bearing with the ring removed to illustrate pads retained by the base.
Figure 1B:
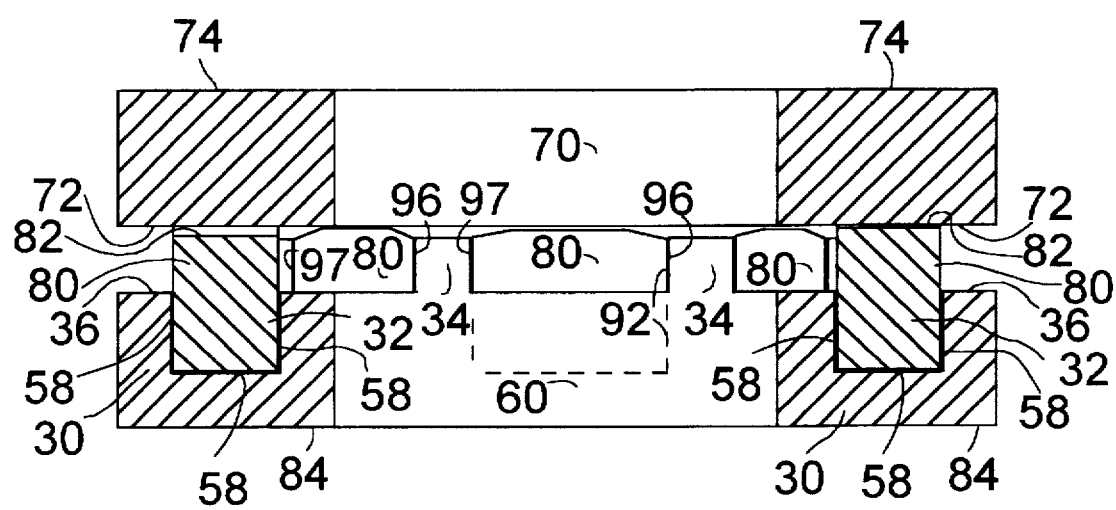
FIG. 1B is a cross-sectional side view of the first embodiment axial bearing as viewed along reference line 1B—1B in FIG. 1A; the ring and the base are cut-away to reveal the features of the present invention.

FIG. 1A and FIG. 1B show a first embodiment of the axial bearing of the present invention. FIG. 1A deletes the ring 70 to better illustrate the arrangement of the pads 80. FIG. 1B shows a cross-sectional view of the axial bearing with a portion of the axial bearing cut away.

The axial bearing comprises a base 60, a ring 70, and pads 80. The base 60 is a cylindrical member. The base 60 has a hollow region 61 through which a shaft may pass. The base 60 retains and supports the pads 80, which are oriented in a curved configuration with respect to one another. The pads 80 have first sides 82 and the ring has a first face 72. The first sides 82 face and are oriented substantially parallel to the first face 72.

The base 60 has retaining means for retaining the pads 80. Here, in the first embodiment of the axial bearing, the retaining means comprises series of circumferentially arranged pockets 58 extending into the base 60 from the base face 36 A portion of a pad 80 in FIG. 1A is cut away to reveal a plan view of a pocket 58. The pockets 58 may have virtually any shape, including cylindrical, annular or rectangular shapes. In FIG. 1A, each pocket 58 has a complex geometric shape resulting from the union of a substantially rectangular recess with two arched recesses. The two arched recesses extend from two opposite sides of the rectangular recess to form a single pocket 58.

Each pocket 58 surrounds a portion of a corresponding pad 80. However, the pocket 58 does not surround one side of the pad 80. The exposed side of the pad 80 is the first side 82. The first side 82 is oriented to face the first face 72 of the ring 70 in a substantially parallel manner, excluding the consideration of any tapered surfaces of the first side 82. The pocket periphery or pocket walls prevent radial movement of the pads 80.

Figure 1C:
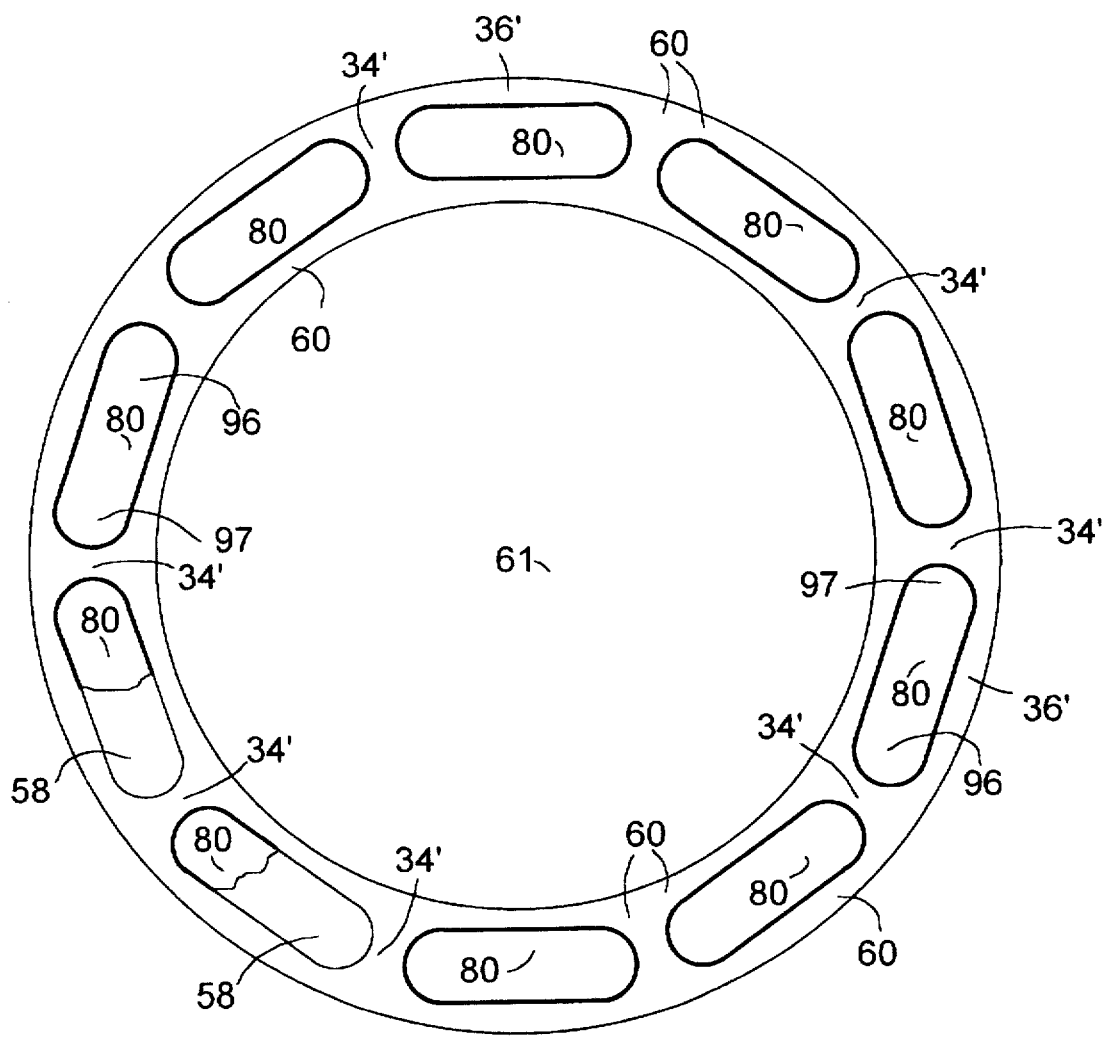
FIG. 1C is a top plan view of an alternate first embodiment of the axial bearing with the ring removed to illustrate intervening portions which are substantially the same axial height as the base face.

The pockets 58 are separated from each other by intervening portions 34 of the base 60. The elevation of the intervening portion 34 is equal to or less than the lowest portion of the first side 82 of an adjacent pad 80. For example, the intervening portion 34 may be from one-hundredth to three-hundredths of an inch below the lowest portion on the first side 82 of the adjacent pad 80. The intervening portion 34 may be elevated above the remaining surface area of the base face 36 as best illustrated in FIG. 1B. FIG. 1C shows an alternate first embodiment of the axial bearing in which the intervening portions 34' are the same axial height as the base face 36'.

The axial clearance between the intervening portions 34 and the ring 70 may form a leakage joint when the axial bearing is installed in a centrifugal pump. Decreasing the axial clearance between intervening portion 34 and the ring 70 may reduce fluid flow through the leakage joint. The axial clearance between the intervening portion 34 and the ring 70 is conveniently controlled by adjusting the pad heights 92 Hence, the axial clearance can readily be changed in the field by selecting pads 80 with different pad heights 92.

The retaining means (i.e. pockets 58) in the base 60 have a first interlocking cross section 30. Meanwhile, the pads 80 have a second interlocking cross section 32 that complements the size and shape of the first interlocking cross section 30. "Complements" means that any protrusions of the first interlocking cross section 30 substantially conform to any recesses of the second interlocking cross section 32, and vice versa. The first interlocking cross sections 30 are united with the second interlocking cross sections 32 to frictionally retain the pads 80 with respect to the base 60. The first interlocking cross section may have, but need not have, an identifiable opposite sex with respect to the second interlocking cross section.

The retaining means retains the pads 80 while preferably permitting a user to remove the pads 80 for replacement or inspection. During operation of the axial bearing, the frictional retention of the pads 80 by the retaining means is reinforced intermittently or continuously by compressive axial forces upon the ring 70 and base 60. While retaining means could include an adhesive placed between the base 60 and the pads 80, the application of an adhesive is generally not required. Likewise, while fasteners could be used to affix the pads 80 to the base 60, fasteners between the base 60 and pads 80 are not required.

The pad 80 has pad peripheral surfaces. The pad peripheral surfaces are in frictional contact with the pocket periphery or the pocket walls. The pad peripheral surfaces contact the pocket 58 at a plurality of contact points. The pads 80 can be, but need not be, press-fitted into the pockets 58. The pad periphery may exceed the dimensions of the pocket 58 or recess at the contact points by less than five-thousandths of an inch to facilitate a press-fit. Accordingly, the base 60 may slightly expand at the pocket 58 once a corresponding pad 80 is inserted into the pocket 58.

The pads 80 have sides, including a first side 82 and a second side 84. In FIG. 1A, the first side 82 of the pads 80 has a substantially rectangular area with an arched leading section 96 and an arched trailing section 97. The first side 82 of the pads could take a variety of shapes. For example, the first side 82 could be substantially elliptical, substantially circular, substantially rectangular, substantially trapezoidal, substantially triangular, substantially arched, substantially pie-shaped, or the like. In alternate embodiments, the pads could be shaped to mate with adjacent pads similar to the way in which paving stones are interlocked. The second sides 84 of the pads 80 are placed within pockets 58 in the base 60.

Each pad 80 has a pad height 92 that is preferably tapered. The tapered pads 80, considered collectively, form a series of wedges. The tapered pad heights 92 optimize the lubrication at the bearing interface between the first side 82 and the first face 72. For instance, the leading section 96 of each pad 80 may have the lowest pad height while the trailing section 97 of each pad may have the highest pad height. In practice, both the leading section 96 and the trailing section 97 are tapered so that the pad 80 may be oriented in either direction during the installation process without causing any problems.

The leading section 96 of each pad 80 encounters relative sliding motion of a given point on the ring 70 prior to the trailing section 97 of the same pad 80. For example, if the pads 80 were rotating in a clockwise direction with respect to the ring 70, the labeling of the leading section 96 and the trailing section 97 would be correct as shown in FIG. 1 A.

The optimal length and angle of tapered regions, including the leading section 96 and the trailing section 97, will vary with the material of the pads 80. The optimum angle for tapering the leading section 96 and/or trailing section 97 of ceramic pads ranges from one-half to two degrees. The length of each tapered region for ceramic pads will generally be less than twenty percent of the longitudinal radial pad length.

The ring 70 is a substantially annular member with faces, including the first face 72 and a second face 74. The ring 70 has a centrally located hollow region through which a shaft may pass. The first face 72 of the ring 70 faces the first sides 82 of the pads 80 in a substantially parallel orientation. During operation of the axial bearing, the first face 72 and the first sides 82 move relative to one another. In other words, either the first face 72 or the first sides 82 may rotate. The pads 80 may be lubricated and/or cooled by a lubricating fluid. A thin-film of lubricating fluid may separate the first face 72 and the first sides 82. However, sliding contact of the first face 72 and the first sides 82 is permissible if the first sides 82 and the first face 72 are made from ceramic, polytetrafluoroethylene (PTFE), or the like.

The pads 80 are preferably constructed from a ceramic material, such as silicon carbide, or a plastic material, such as fiber-reinforced polytetrafluoroethylene (PTFE). Likewise, the ring 70 is preferably constructed from a ceramic material or a plastic material. The pads 80 may be constructed from a variety of ceramic materials, including tungsten carbide, silicon carbide, alumina, bauxite, and zirconia. The base 60 is optimally constructed from a fiber-reinforced plastic, plastic, a fiber-reinforced polymer, a plastic composite, a fluoroplastic, or a polymer composite. The base 60 is preferably constructed partially or entirely from a plastic or a polymer to provide damping action in response to fluctuations of axial loads. The plastic or polymer used for the base 60 has first modulus of elasticity selected to provide axial damping of loads. Meanwhile, the ceramic material used for the pads 80 has a second modulus of elasticity. The first modulus of elasticity, associated with the load damping plastic or polymer, is greater than the second modulus of elasticity associated with the inherently rigid ceramic material. In other embodiments, the pads 80, the ring 70, and the base 60 could be constructed from metals, alloys, ceramics, plastics, reinforced plastics, plastic laminates, plastic composites, polymers, polymer composites, or any combination of the foregoing materials.

By making the pads 80 from plastic, a plastic composite, or from plastics with elastomer coatings, contaminants can become imbedded in the plastic or elastomer rather than damaging the bearing faces (i.e. the first face 72 and the first sides 82). By using plastic or polymers made from appropriate plastics or polymers, the pads 80 or base 60 can provide damping action in response to fluctuations in axial loads because certain plastics or polymers can temporarily deform while under compression and elastically expand once the compression is removed. The Handbook of Plastics, Elastomers, and Composites lists the properties of plastic resins to assist engineers and scientists in the selection of suitable plastic resins or polymers for particular applications. The chart in Appendix C on pages C1 to C50 of the Handbook of Plastics, Elastomers, and Composites by Charles A. Harper, published by McGraw-Hill, Inc. in New York, New York (Second Edition 1992), is hereby incorporated by reference into this specification.

In practice, if the axial bearing is used in a centrifugal pump, the base 60 may be integrated into an impeller itself, rather than having a separate base. The impeller, which includes the base 60, is constructed from a polymer, a polymer composite, plastic, a plastic composite, a fiber-reinforced plastic, a fiber-reinforced polymer, or a fluoro-plastic. The impeller may provide damping action for changes in axial loads.

Additional Examples of the Axial Bearing

FIG. 2A through FIG. 5, inclusive, show different examples of the above axial bearing of the present invention. The full scope of the invention can better be appreciated with additional variations or examples of the axial bearing of the present invention.

Figure 2A:
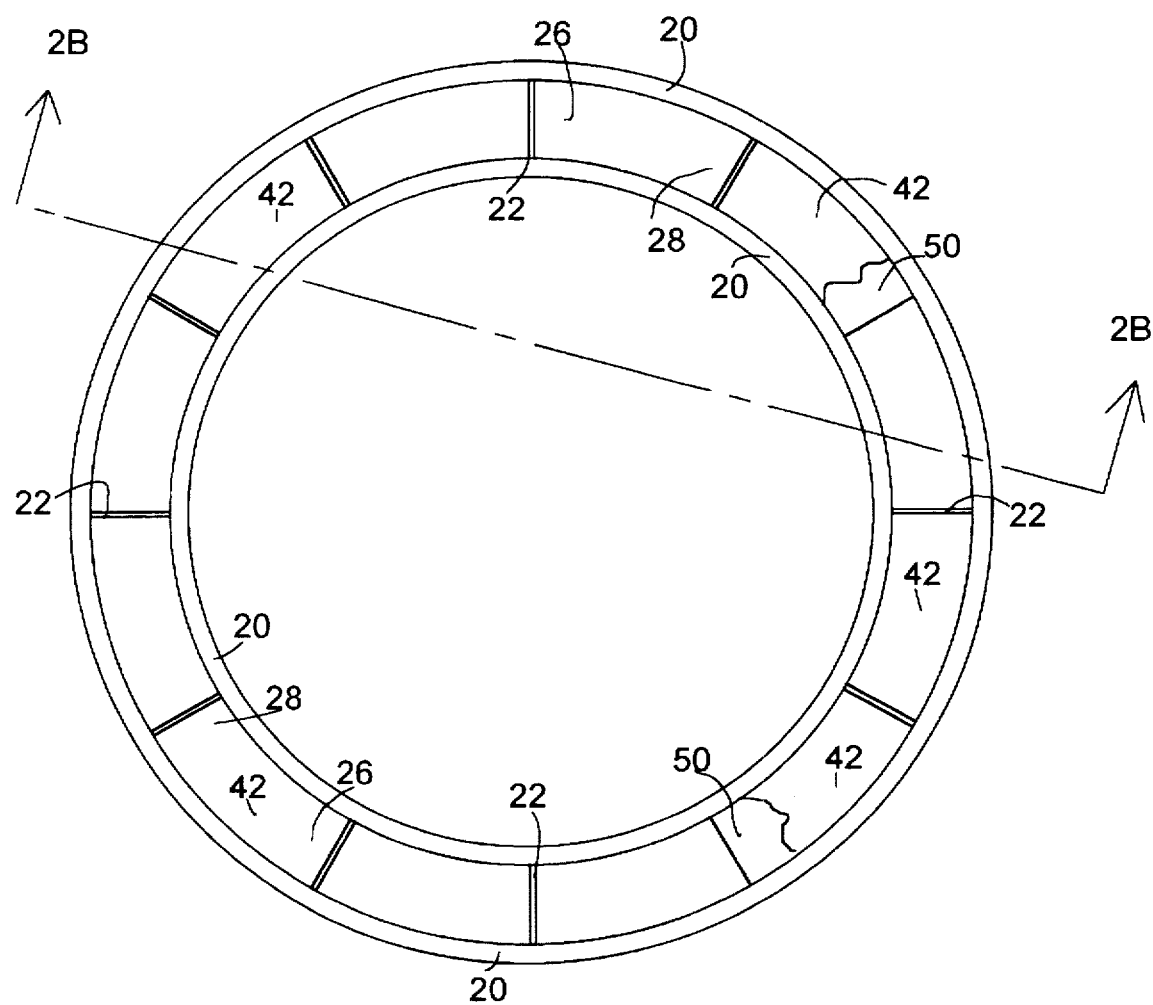
FIG. 2A is a top plan view of a second embodiment of the axial bearing with the ring removed to illustrate arched pads.
Figure 2B:
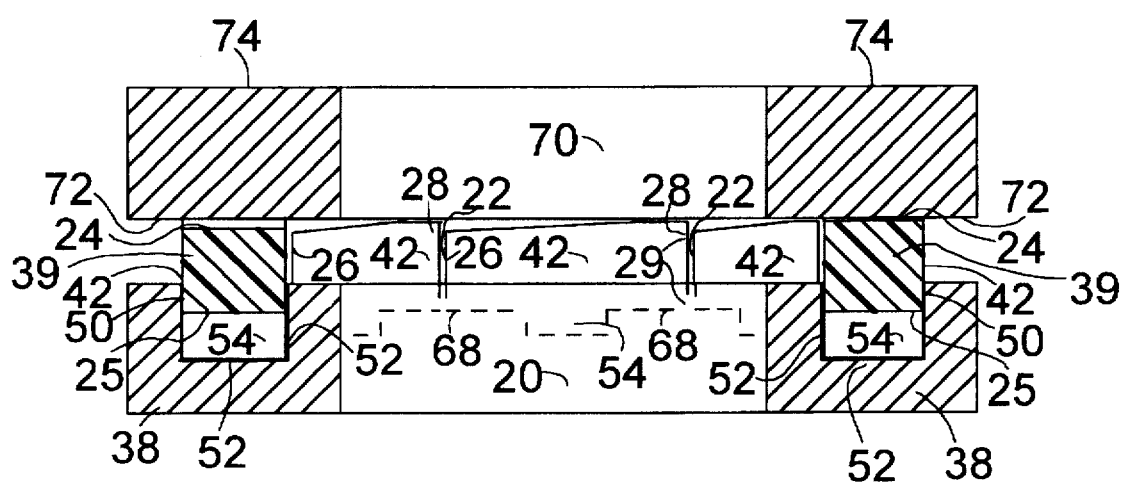
FIG. 2B is a cross-sectional side view of the second embodiment of the axial bearing as viewed along reference line 2B—2B in FIG. 2A; the ring and the base are cut-away to reveal anchoring protrusions.

FIG. 2A and FIG. 2B depict a second embodiment of the axial bearing of the present invention with arched pads 42 (version of pads in FIG. 2A) located in base 20. An anchoring protrusion 54 extends from a second side 25 of each pad 42. The arched pads 42 are placed in a substantially annular recess 50 having a bottom 68. Within the bottom 68 of the substantially annular recess 50, anchoring recesses 52 are located for mating with the anchoring protrusions 54. The arched pads 42 are oriented to form a circular arrangement. A leakage joint is represented by the narrow gap 22, if any, between the arched pads 42.

As best illustrated in FIG. 2B, the anchoring protrusions 54 are shaped like a polyhedrons (i.e. hexahedrons). The anchoring protrusions 54 mate with anchoring recesses 52 that correspond to the shape of the anchoring protrusions 54. In other words, the first interlocking cross section 38 of the base 20 and the second interlocking cross section 39 of the arched pads 42 conform in shape to one another. The first interlocking cross sections 38 are united with the second interlocking cross sections 39 to retain the pads 42 within the base 20. Once the anchoring protrusion 54 and the anchoring recess 52 are joined, the pads 42 are prevented from rotating within the substantially annular recess 50. Sliding movement between the pads 42 and the ring 70 is ensured, rather than undesirable sliding movement between the pads 42 and base 60. In other embodiments, the annular recess 50 may have islands (i.e. elevated regions) extending from the annular recess between adjacent pads 42 to prevent movement.

Each pad 42 has a pad height 29. The pad heights 29 are optimally tapered or slanted so that the leading section 26 of each pad 42 has the lowest pad height 29 and the trailing section 28 of each pad 42 has the highest pad height 29. The leading section 26 of each pad 42 is defined with reference to the relative rotational movement of each pad 42 with respect to the ring 70. For example, if the ring 70 is rotating, the leading section 26 of the stationary pad 42 passes a given point on a periphery of the ring 70 before the trailing section 28 of the same pad 42. If the pads 42 are rotating, the leading section 26 passes a given point on a periphery of the stationary ring 70 before the trailing section 28 of the same pad 42. The leading section 26 of each pad 42 has a greater clearance between the first side 24 of the pad 42 and the first face 72 of the ring 70 than the trailing section 28 of the same pad 42 does. The tapered surface of the leading section 26 preferably extends over a maximum of twenty-percent of the radial length of the pads 42 for ceramic material. The slanted or tapered surface may improve lubrication and cooling at the bearing interface. During the manufacturing of the pads 42 with plastics, voids in the plastic pad 42 material may be eliminated by readily compressing multiple pads 42 with small volumes, as opposed to compressing one large pad 42.

Figure 3:
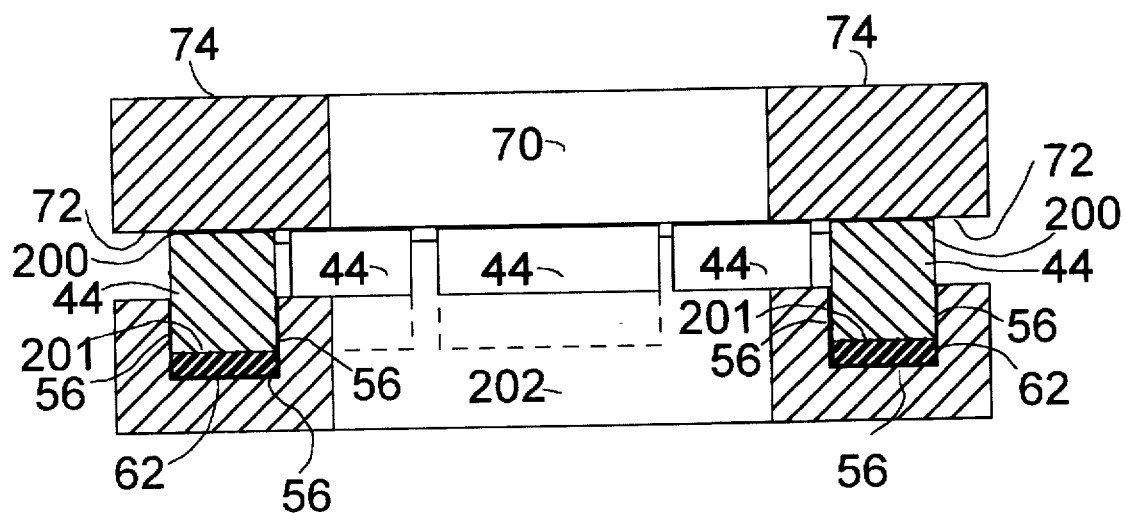
FIG. 3 is a cross-sectional, side view of a third embodiment of the axial bearing with the ring and base cut away to reveal pads with a resilient member being positioned in an annular recess.

FIG. 3 depicts a third embodiment of the axial bearing of the present invention. The actual shape of the pad 44 (version of pad in FIG. 3) is not critical. In practice, the pad 44 could have a tapered height as previously illustrated in the other embodiments. The axial bearing of the third embodiment has a resilient member 62 interposed between each pad 44 and a recess 56 in the base 202.

The resilient member 62 preferably comprises an elastomer. Elastomers include various types of natural and synthetic rubbers which generally have elastic properties. Elastomers include natural rubber, styrene butadiene, isobutene isoprene, chlorinated isobutane isoprene, ethylene propylene copolymer, ethylene propylene terpolymer, chlorosulfonated polyethylene, chloroprene, neoprene, chlorinated polyethylene, nitrile butadiene, epichloro-hydrin, polyacrylate silicone, silicone, urethane, fluorosilicone, fluorocarbon and perfluorocarbon materials. Among these elastomers, fluorocarbon and ethylene propylene terpolymer are preferable. A first side 200 of the pad faces the first face 72 of the ring 70. The elastomer may be bound to the second side 201 of each pad 44 or alternatively bound to the recess 56 (i.e. recess region) of the base 202. The resilient member 62 can also be confined merely by compressive forces applied to the base 202 and the ring 70. In FIG. 3, each pad 44 is preferably constructed from a ceramic, a ceramic composite, a metal, or an alloy. The resilient member 62 can be modeled as a spring having a spring constant K which is selected to provide appropriate damping of axial loads from a pump impeller or the like.

Figure 4:
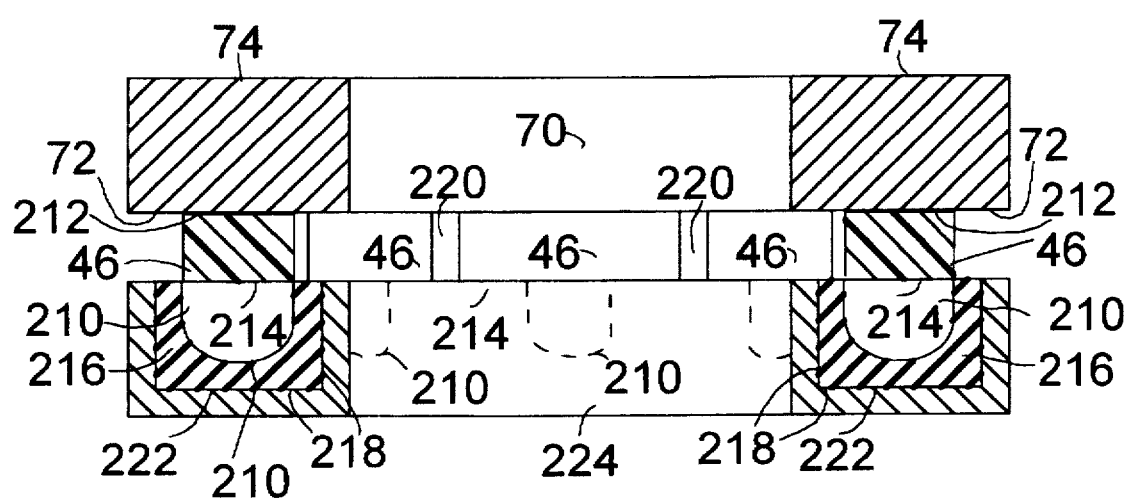
FIG. 4 is a cross-sectional, side view of a fourth embodiment of the axial bearing with the ring and the base cut away to reveal a substantially annular recess filled with a resilient material that confines the pads.

FIG. 4 depicts a fourth embodiment of the axial bearing of the present invention. The retaining means and the pads 46 (version of pads in FIG. 4) are different than previous embodiments illustrated in the specification. The pads 46 have a first side 212 and a second side 214. A gap 220 is located between adjacent pads 46. The retaining means preferably comprises a substantially annular recess 218 which is filled with a resilient material 216, such as an elastomer. The annular recess 218 has a bottom 222. Each pad 46 has a nodule or a curved protrusion 210 extending from the second side 214 of the pad 46. The curved protrusion 210 is preferably substantially spherical. The curved protrusion 210, may take forms other than spherical, but the protrusion 210 is generally arched, pointed, peaked, or convex.

During the assembly of the axial bearing, the pads 46 are temporarily aligned within an empty, substantially annular recess 218. While the pads 46 are located within the substantially annular recess 218, the recess 218 is filled with an elastomer which holds the pads 46 captive. The pads 46 and the base 224 are preferably made from plastics, polymers, composites, or the like. The pads 46 may also be made from ceramics.

Figure 5:
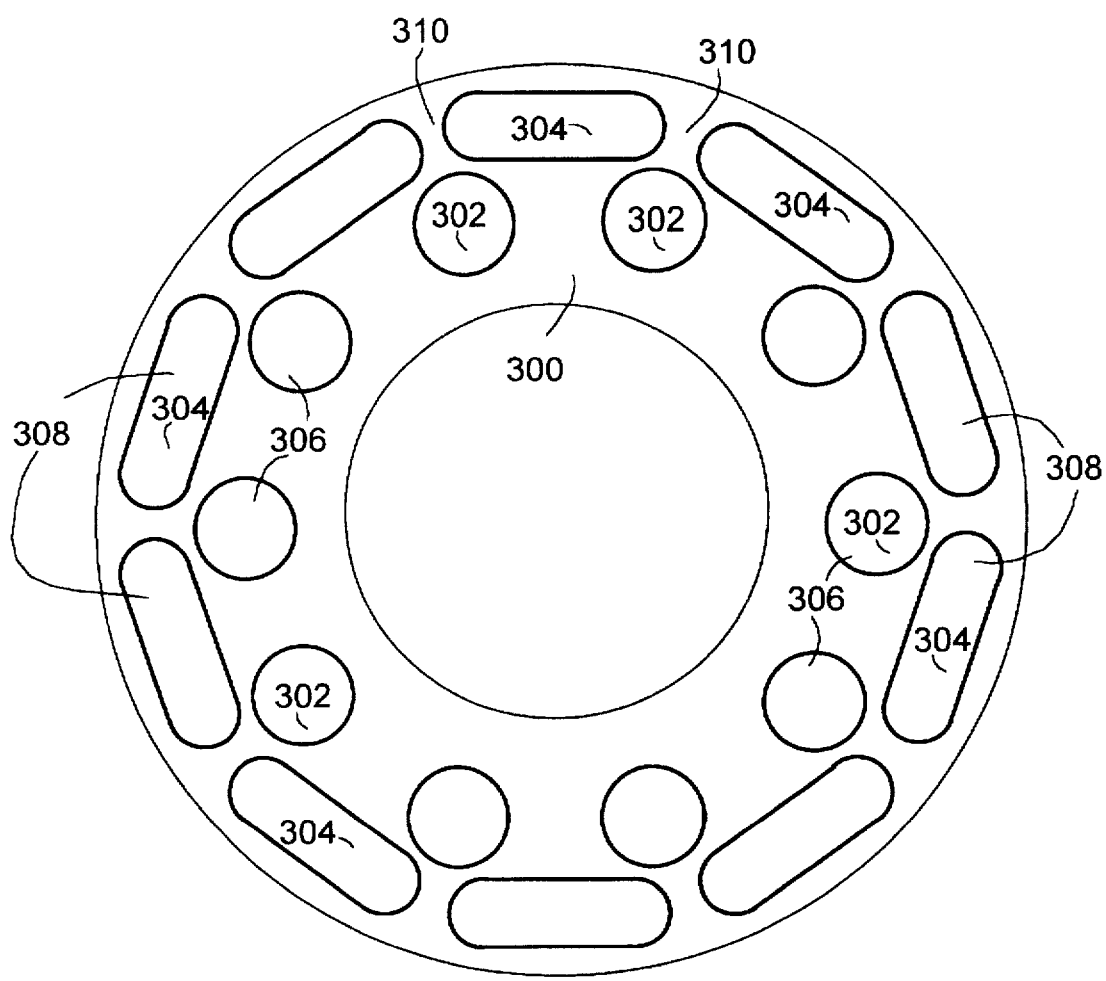
FIG. 5 shows a fifth embodiment of the axial bearing-wear ring of the present invention with an inner and outer periphery of pads.

FIG. 5 shows a fifth embodiment of the axial bearing of the present invention. The pads of the fifth embodiment include inner pads 302 and the outer pads 304. The inner pads 302 and the outer pads 304 may be substantially arched, elliptical, cylindrical, rectangular or shaped in numerous other ways. Here in FIG. 5, the outer pads 304 are preferably substantially rectangular with arched trailing and leading sections, while the inner pads 302 are cylindrical. The inner pads 302 may have less exposed surface area that the outer pads 304.

The inner pads 302 are arranged in an inner group 306; the outer pads 304 are arranged in an outer group 308. The inner group 306 is located closer to the rotational axis of the base 300 than the outer group 308. The inner group 306 and the outer group 308 are preferably arranged in a circular or elliptical configuration such that the inner group 306 is sectorally off-set with respect to the outer group 308. In other words, the inner pads 302 are located near and radially inward from the intervening regions 310 between the outer pads 304. The intervening regions 310 are generally arc-shaped areas between the outer pads 304 where the outer pads 304 are not present.

Axial Bearing-Wear Ring Incorporated into a Centrifugal Magnetic-Drive Pump

Referring to FIG. 6A through FIG. 10, inclusive, the centrifugal pump of the present invention may include an axial bearing as described in any of the foregoing embodiments. Any of the foregoing embodiments of the axial bearing may be incorporated into the pump including the first embodiment through the fifth embodiment. The axial bearing of the present invention may be integrated into each impeller by including the base as an inseparable, integral portion of the impeller. When the axial bearing is integrated into a front shroud of the impeller, the axial bearing may be referred to as an axial bearing-wear ring.

Figure 6A:
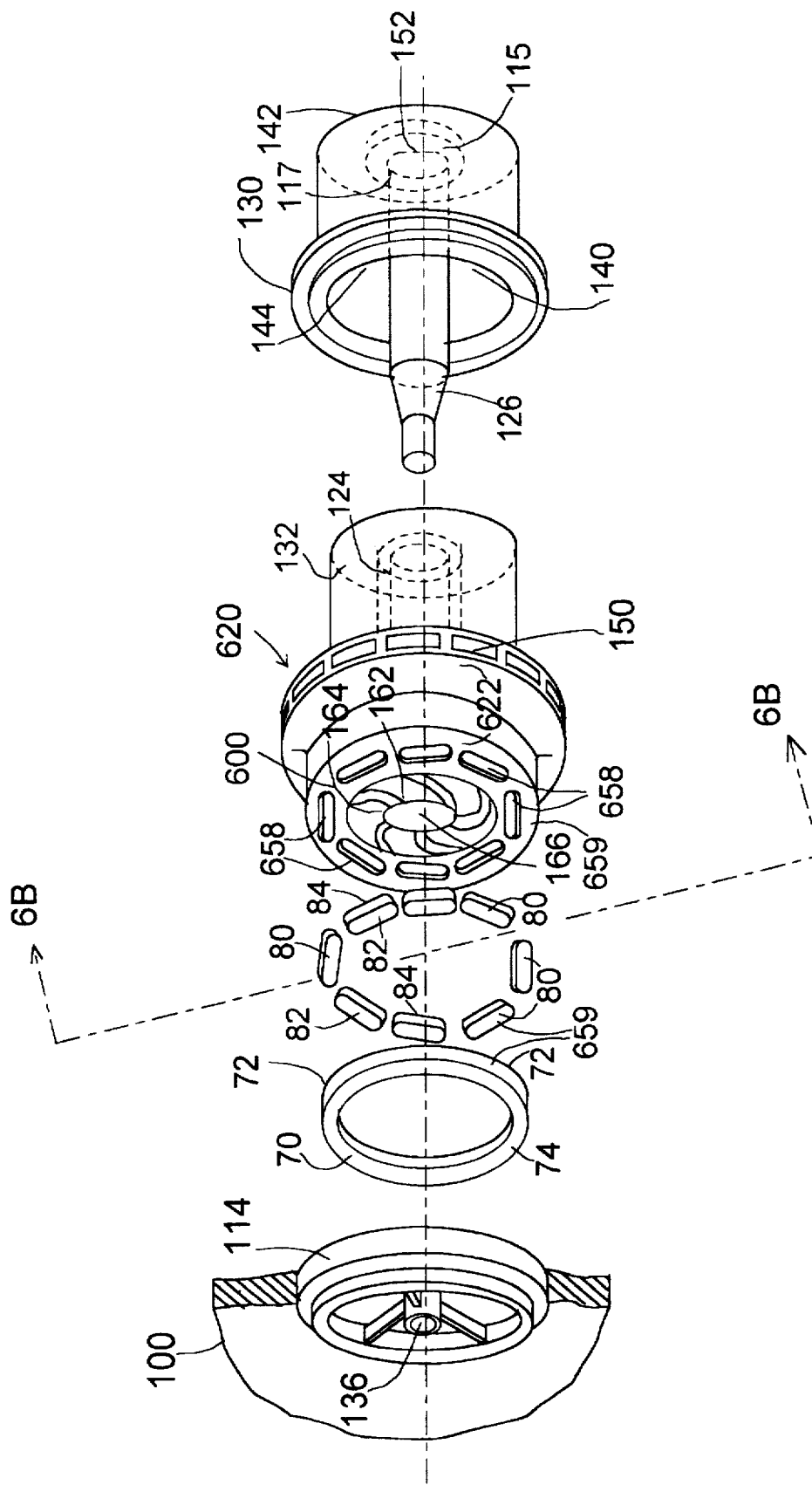
FIG. 6A is a perspective, exploded view of the interior of a centrifugal magnetic-drive pump incorporating a first embodiment of the axial bearing-wear ring with pads retained by pockets in the front impeller shroud.

FIG. 6A shows a first embodiment of an axial bearing-wear ring incorporated into a pump. The axial bearing-wear ring of FIG. 6A is similar to the first embodiment of the axial bearing previously shown in FIG. 1A and FIG. 1B. However, in FIG. 6A the front shroud 622 of the impeller 620 serves as a base and the need for a separate base is obviated.

The front shroud 622 contains recesses 658 or pockets. The recesses 658 are located in an annular projection 600 that extends outward from the front shroud 622. Pads 80 are inserted into corresponding recesses 658. During operation of the pump the impeller 620 rotates relative to the ring 70. The pads 80 function both as an axial bearing and a wear ring.

Figure 6B:
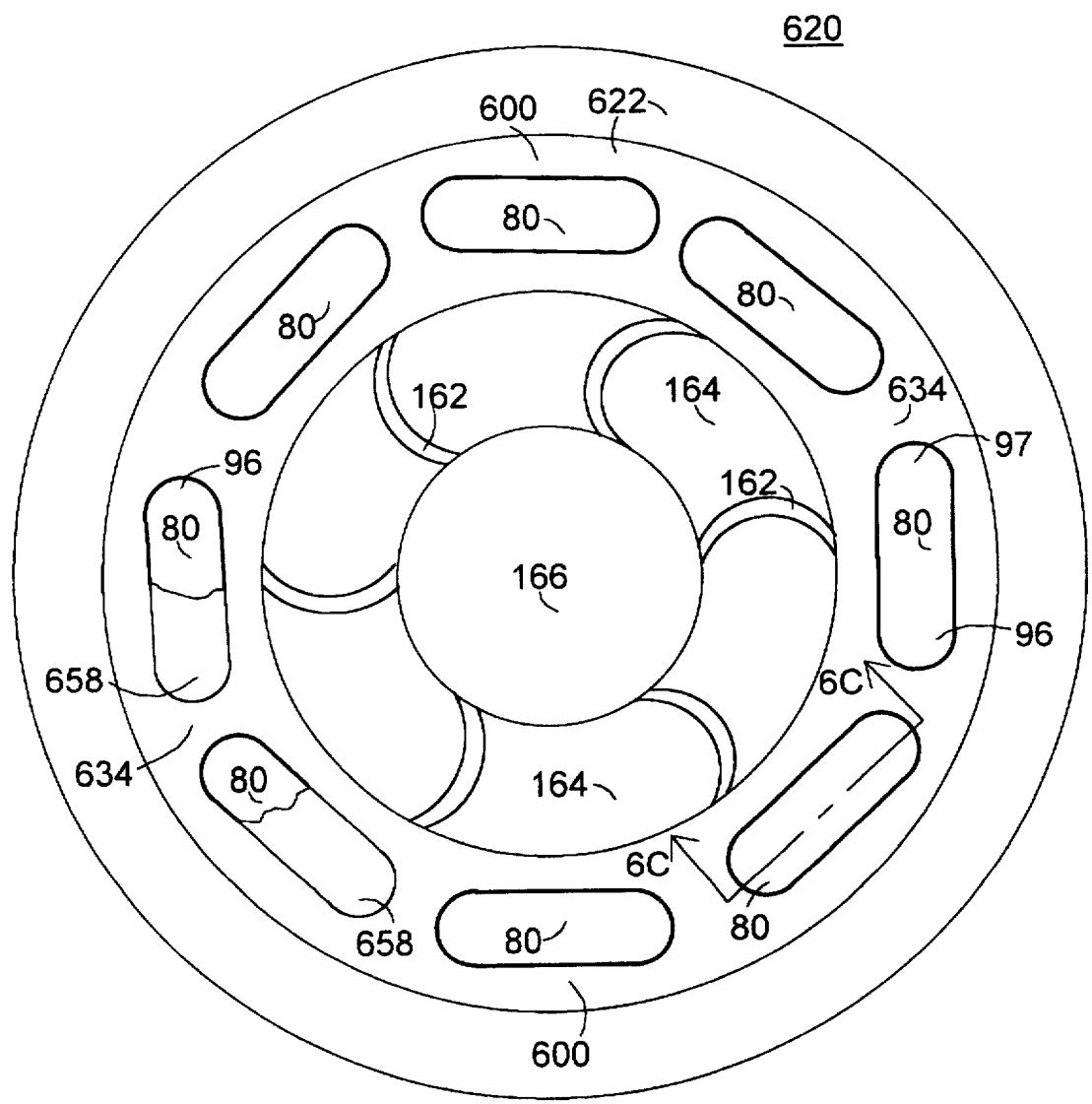
FIG. 6B is a plan view of a front shroud of the impeller as viewed along reference line 6B—6B of FIG. 6A.

FIG. 6B shows a plan view of the front shroud 622 of the impeller 620. The annular projection 600 or shelf extends above the remainder of the front shroud 622 and houses pads 80. The pads 80 are located within the recesses 658 or pockets in the front shroud 622. Blades 162 of the impeller 620 are located radially inward with respect to the circular arrangement of pads 80. The blades 162 are located at and near the impeller intake 164. An aperture 166 is centrally located around the axis of the impeller 620.

Figure 6C:
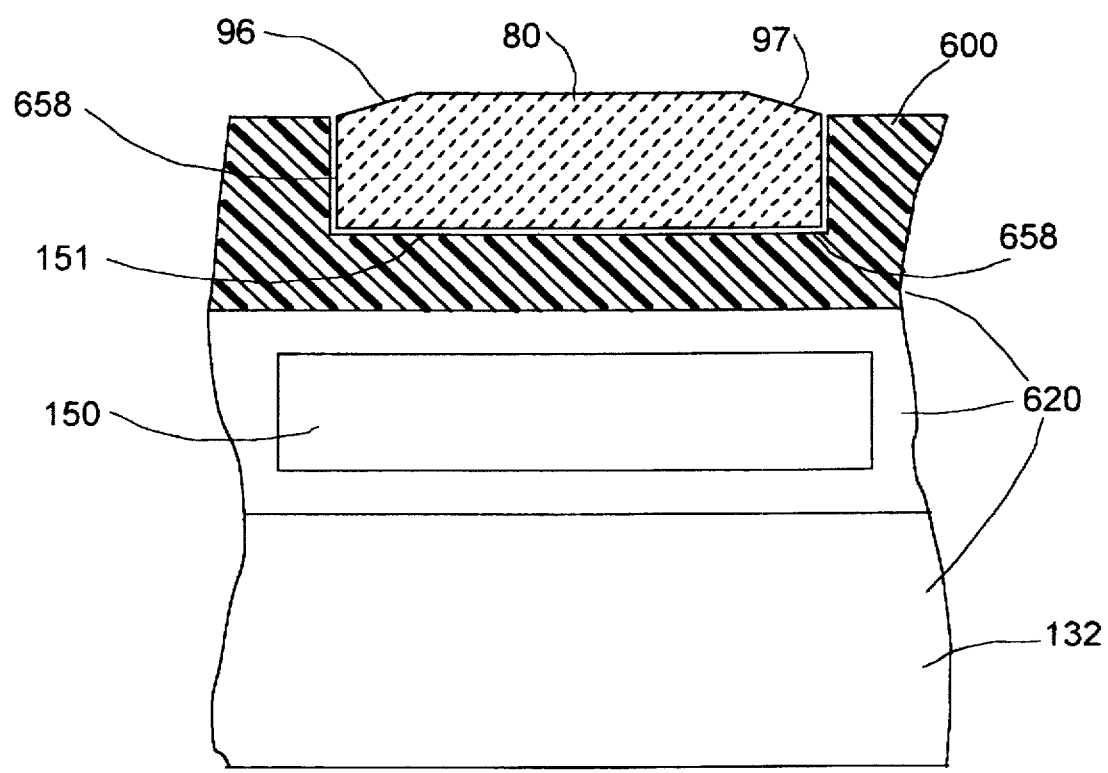
FIG. 6C is a cross-sectional view of the impeller as viewed along reference line 6C—6C of FIG. 6B.

FIG. 6C shows a cross-sectional portion of the impeller 620 with the remainder of the impeller cut away. Each recess 658 has a flat bottom 151. Each pad 80 has a corresponding flat second side 84. The leading sections 96 and the trailing sections 97 of the pads 80 are preferably tapered. The pads 80 are located within the annular projection 600 such that only a portion of the pad heights extend above the annular projection 600. The intervening portion 634 has a height which is approximately equal to the maximum height of the annular projection 600. The annular projection 600 may have a uniform height to simplify manufacturing. The impeller outlet 150 is located below the pad 80 in FIG. 6C.

Figure 6D:
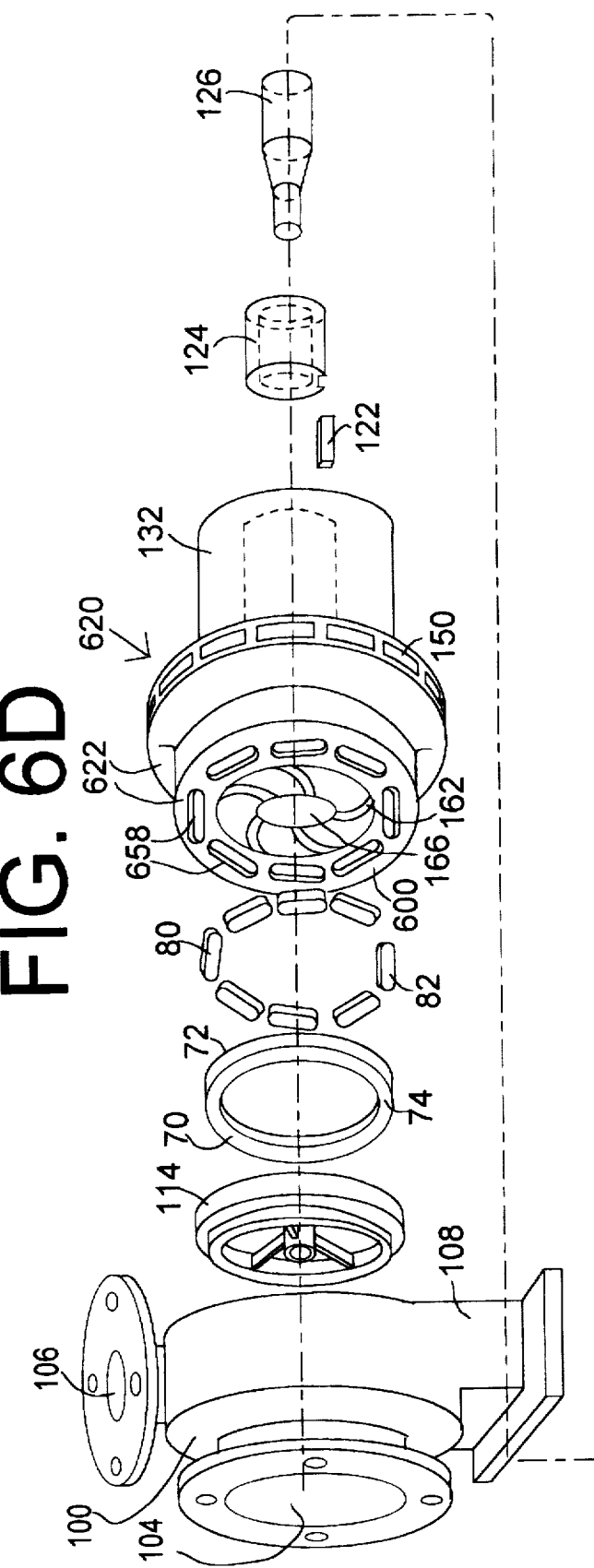
FIG. 6D shows a perspective, exploded view of the entire centrifugal magnetic-drive pump incorporating the first embodiment of the axial bearing-wear ring.
Figure 6D:
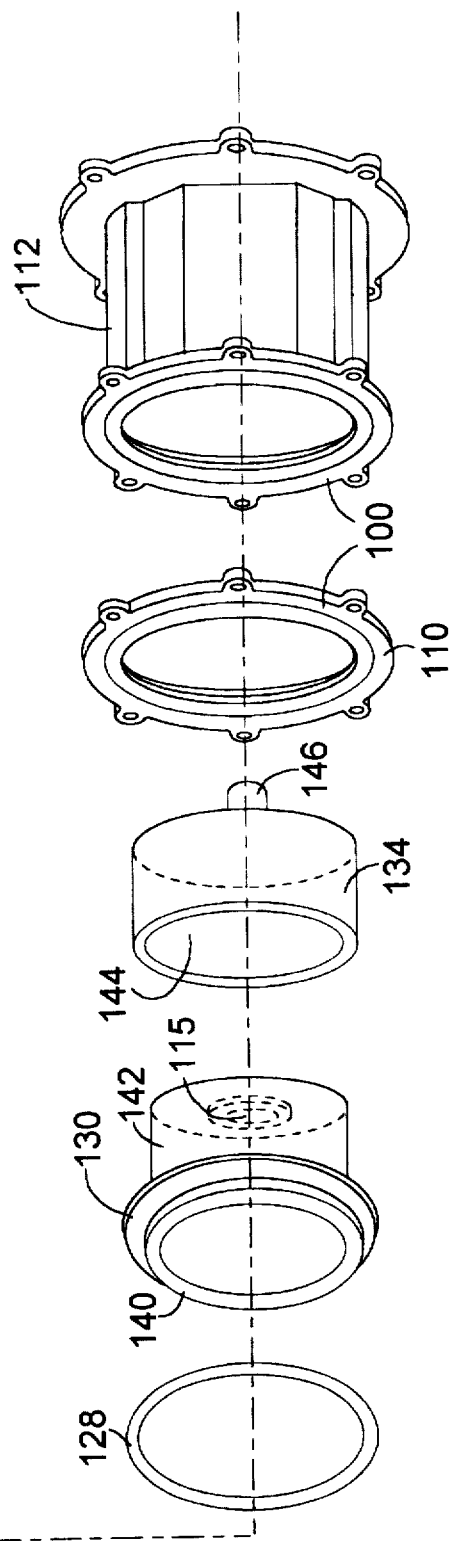

Referring to FIG. 6D and FIG. 6E, the centrifugal pump comprises a housing 100, a shaft 126, an axial bearing 659, a first shaft support 114, a second shaft support 115, a radial bearing 124, an impeller 620, a first magnetic coupler 132, a second magnetic coupler 134, and a containment shell 130.

The housing 100 preferably has a first housing member 108, a second housing member 110, and a third housing member 112. The first housing member 108 and the second housing member 110 mate with a gasket 128 (i.e. an O-ring). The containment shell 130 adjoins the first housing member 108 and the second housing member 110. The second housing member 110 is secured to the first housing member 108. The third housing member 112 is secured to the first housing member 108 or the second housing member 110, or both the first housing member 108 and the second housing member 110.

The housing 100 has an inlet 104 to receive a fluid and an outlet 106 to emit the pumped fluid. The housing 100 has an inlet flange and an outlet flange for the attachment of external plumbing to the pump. The inlet flange and outlet flange have a plurality of holes to facilitate the attachment of external plumbing. The housing 100 may be constructed from cast iron, ductile iron, stainless steel, alloys, or other metals. The interior fluid-contacting surfaces of the housing 100 are preferably coated with a corrosion-resistant lining 139.

The shaft 126 is disposed in the housing 100 and is preferably secured to the housing 100. The shaft 126 is secured to the housing 100 by a support assembly that preferably includes a first shaft support 114 and a second shaft support 115. For instance, the first shaft support 114 may be located near the impeller 620 and the second shaft support 115 may be located adjacent to or integral with the containment shell 130.

The first shaft support 114 and the second support 115 each have a socket, a recess, or an opening which corresponds to and complementally mates with the shaft 126. For example, the first shaft support 114 has an opening 136 that engages the shaft 126. Likewise, the second shaft support 115 may include a socket 117 to mate with the flat mating surface 152 of the shaft 126. The shaft 126 may be secured by press fitting the flat mating surface 152 of the shaft 126 into the socket 117. The engagement of the shaft 126 with the socket 117 prevents the undesired rotation of the shaft 126. The second shaft support 115 may be integrated with the containment shell 130 or may be integrated with the second housing member 110. The first shaft support 114 and the second shaft support 115 are preferably constructed of plastic resin with carbon fiber reinforcement.

The pads 80 have first sides 82 and second sides 84, as best illustrated in FIG. 6A. The ring 70 has a first face 72 and a second face 74. The first sides 82 are directed toward the first face 72. The first sides 82 face the first face 72 to form a bearing interface between the ring 70 and the pads 80. The bearing interface may be lubricated, but need not be lubricated, by pumped fluid which is circulated in the interior of the housing 100. Recirculation of pumped fluid from the high pressure region to the suction region occurs at the bearing interface. The bearing interface is suitable for rotational movement of the pads 80 with respect to the ring 70.

The pads 80 cooperatively engage means for retaining, such as one or more recesses, in the impeller 620. The pads 80 may be press-fitted or snap-fitted into the impeller 620. Hence, the set of pads 80 and the impeller 620 are coupled together and rotate simultaneously.

The ring 70 is preferably press-fitted into the first shaft support 114. The ring 70 is preferably constructed from a ceramic material such as silicon carbide. The first shaft support 114 has a cylindrical recess (not shown) adapted to receive the ring 70. The ring 70 may have nibs about its periphery to prevent rotation of the ring 70 relative to the first shaft support 114. The first shaft support 114 engages the housing 100. The pads 80 rotate with respect to the ring 70 when the pump operates.

The radial bearing 124 is attached to the impeller 620. A key 122, an axial rib, or the like fits in slots located in the radial bearing 124 and the impeller 620 to prevent the impeller 620 from rotating with respect to the radial bearing 124. In a preferred embodiment, the impeller 620 is constructed from a carbon filled plastic resin, such as a mixture of polyacrylonitrile (PAN) carbon fiber and ethylene-tetra-fluoro-ethlene (ETFE).

The impeller 620 has a cylindrical portion which optimally encapsulates the first magnetic coupler 132. The first magnetic coupler 132 comprises a magnet, a rare-earth magnet, a plurality of magnets, or a torque ring. A torque ring is typically constructed from a metal such as steel, copper, an alloy, or the like. As illustrated the impeller 620 is a fully closed impeller, in which the vanes are concealed by a back shroud and a front cover. In practice, the impeller 620 may be partially open impeller, or a fully open impeller depending upon the characteristics of the fluid to be pumped. The first magnetic coupler 132 is enclosed by the containment shell 130 and a portion of the housing 100. The first magnetic coupler 132 is located on a wet side 140 of the containment shell 130.

The second magnetic coupler 134 is located in proximity to the first magnetic coupler 132 on a dry side 142 of the containment shell 130. The second magnetic coupler 134 has a cylindrical cavity 144 which is coaxially oriented with respect to the containment shell 130. The second magnetic coupler 134 comprises a magnet, a rare-earth magnet, a plurality of magnets, an electromagnet, a plurality of electromagnets, or a torque ring. The second magnetic coupler 134 is coupled to a drive motor (not shown) via a drive motor coupling 146.

The containment shell 130 is secured to the housing 100. The containment shell 130 is preferably constructed from a nonconductive material, such as ethylene-tetra-fluoro-ethlene (ETFE), or a fiber fabric vinyl ester composite. The containment shell 130 may also be made from stainless steel, nickel, cadmium, a metal, an alloy, or the like. The containment shell 130 confines the pumped fluid to the wet side 140 of the containment shell 130.

Variations of the Axial Bearing-Wear Ring For Impellers

Figure 7A:
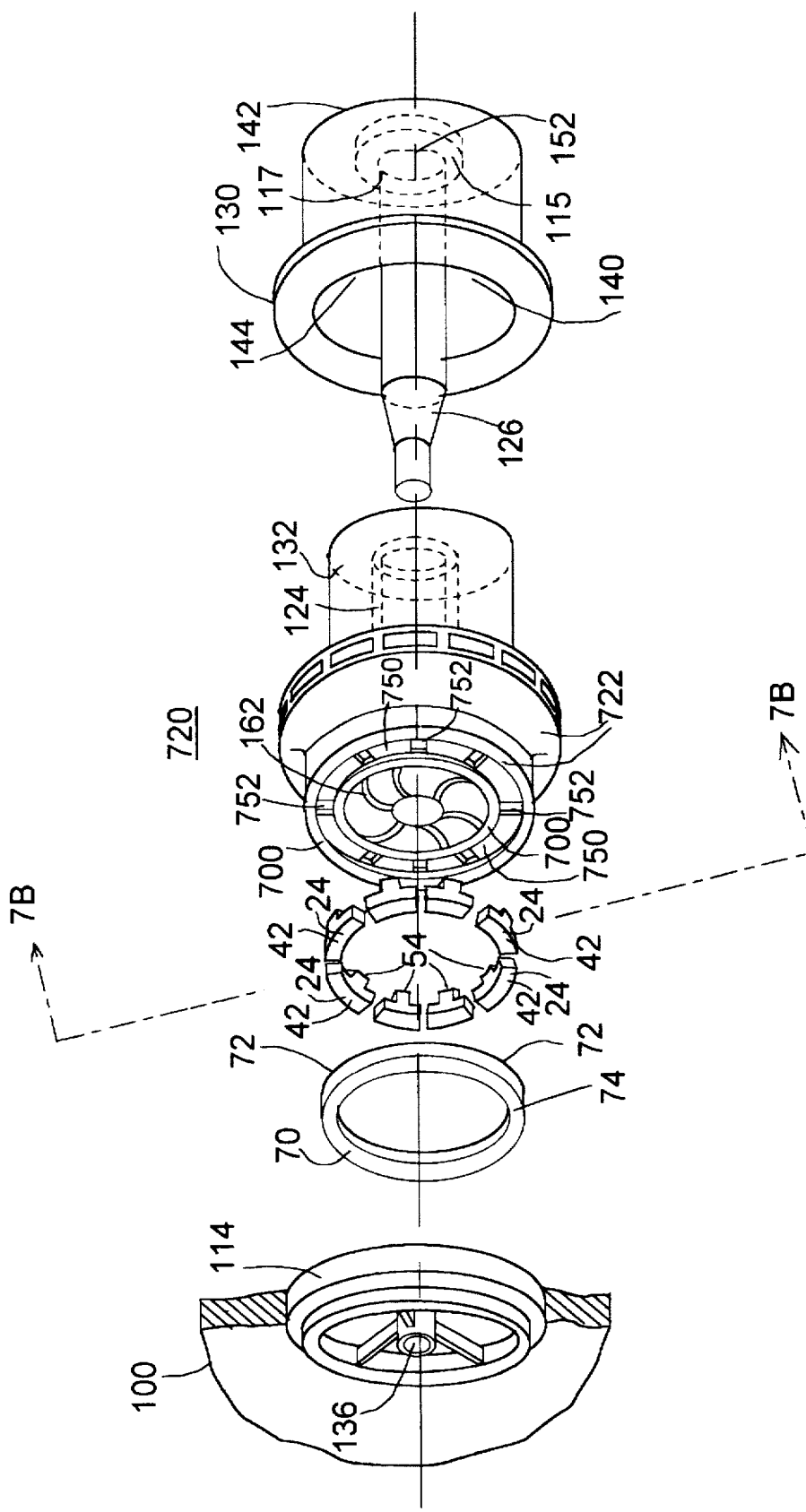
FIG. 7A is a perspective, exploded view of the interior of a centrifugal magnetic-drive pump incorporating a second embodiment of the axial bearing-wear ring, wherein arched pads are retained in an annular recess in the impeller.

FIG. 7A shows a second embodiment of the axial bearing-wear ring installed in a pump. The axial bearing-wear ring of FIG. 7A is similar to the axial bearing previously shown in FIG. 2A and FIG. 2B. However, in FIG. 7A the front shroud 722 of the impeller 720 serves as a base and the need for a separate base is obviated. A substantially annular recess 750 with anchoring recesses 752 is located in an annular projection 700 extending from the front shroud 722. The substantially annular recess 750 receives corresponding arched pads 42 with anchoring protrusions 52.

Figure 7B:
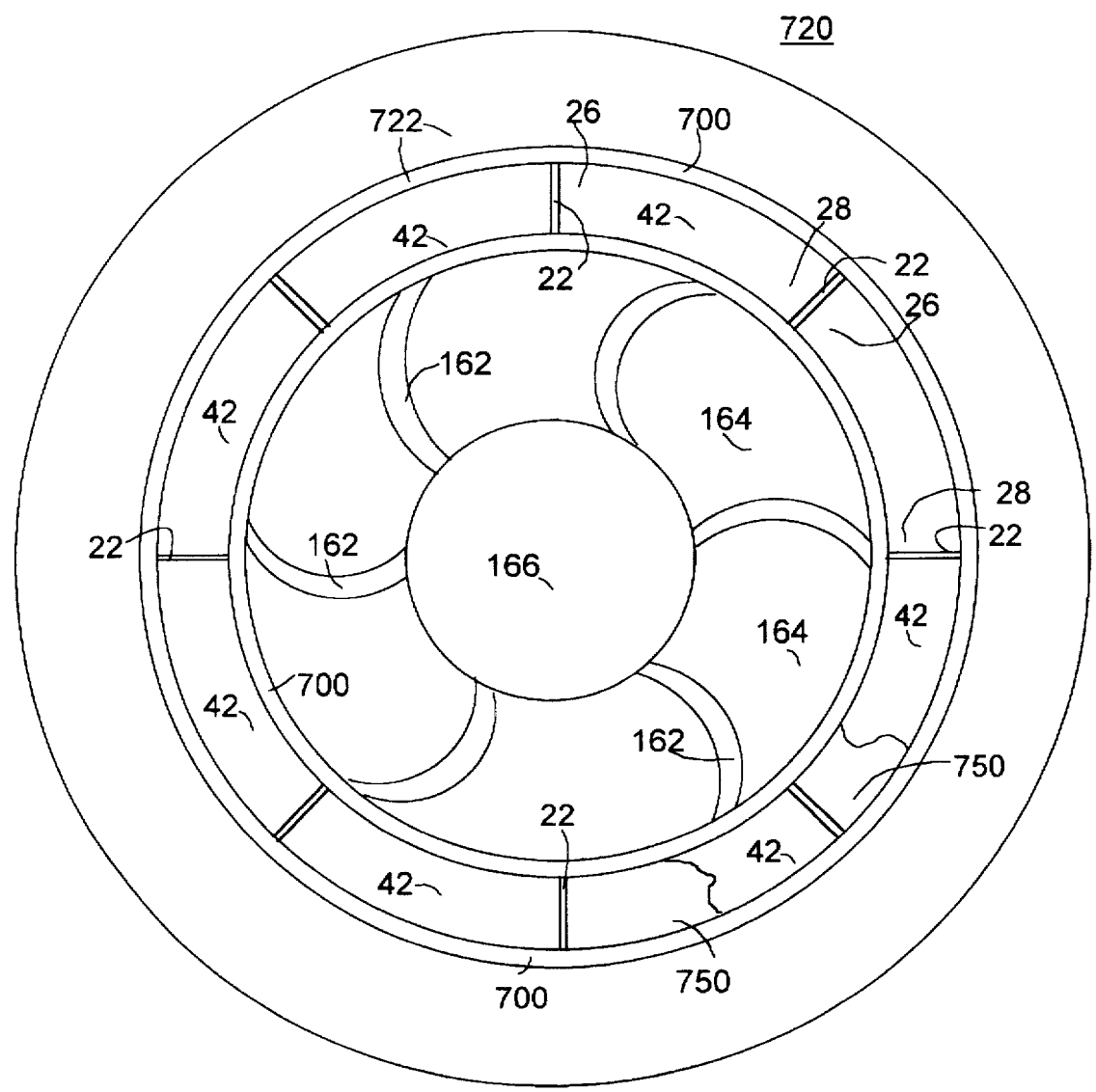
FIG. 7B is a plan view of a front shroud of the impeller as viewed along reference line 7B—7B of FIG. 7A.

FIG. 7B shows a plan view of the front shroud 722 of the impeller 720 as viewed from reference line 7B—7B on FIG. 7A. During operation of the pump the impeller 720 rotates relative to the ring 70. The pads 42 function both as an axial bearing and a wear ring.

Figure 8A:
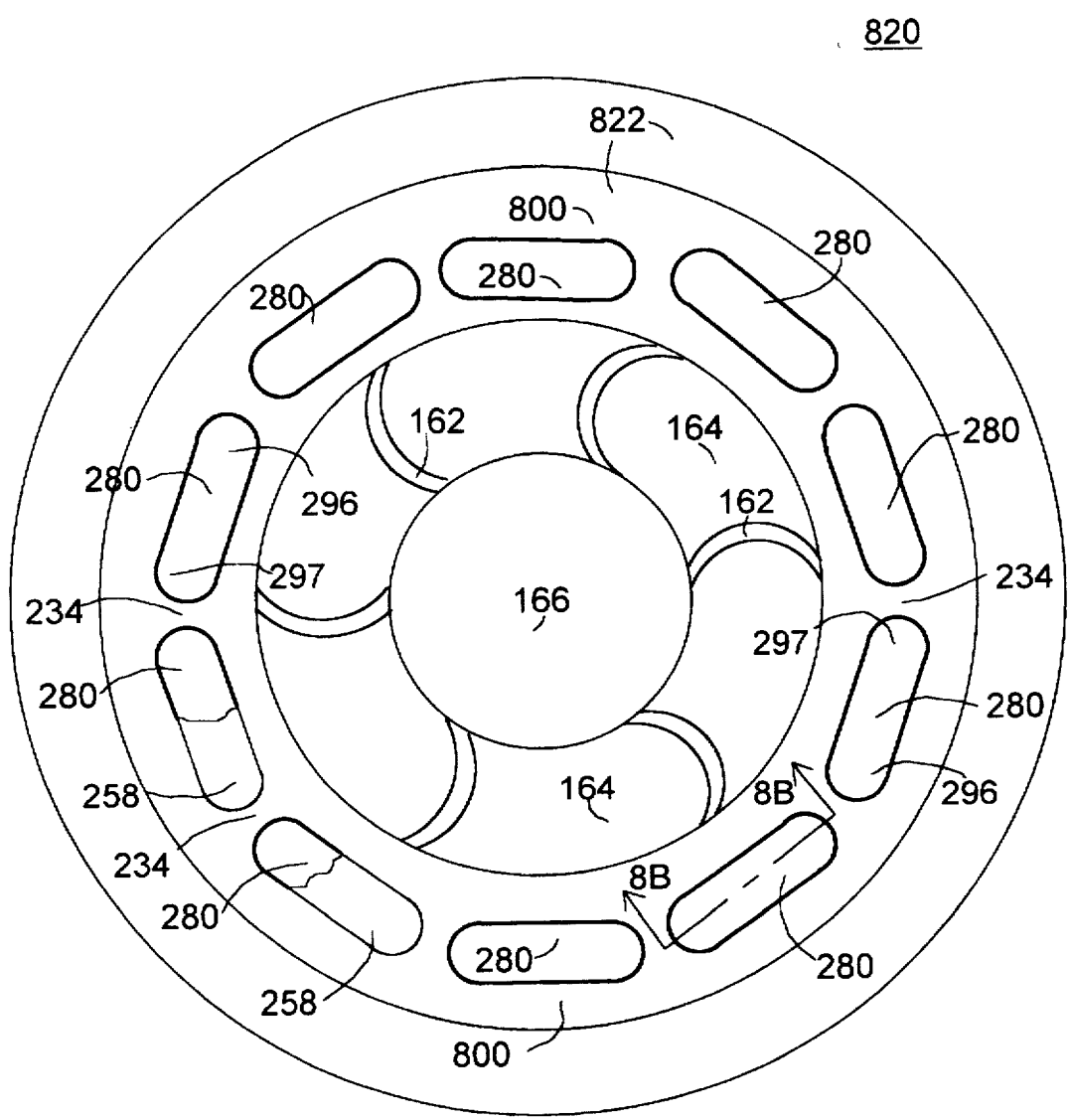
FIG. 8A is a plan view of an impeller incorporating a third embodiment of the axial bearing-wear ring.
Figure 8B:
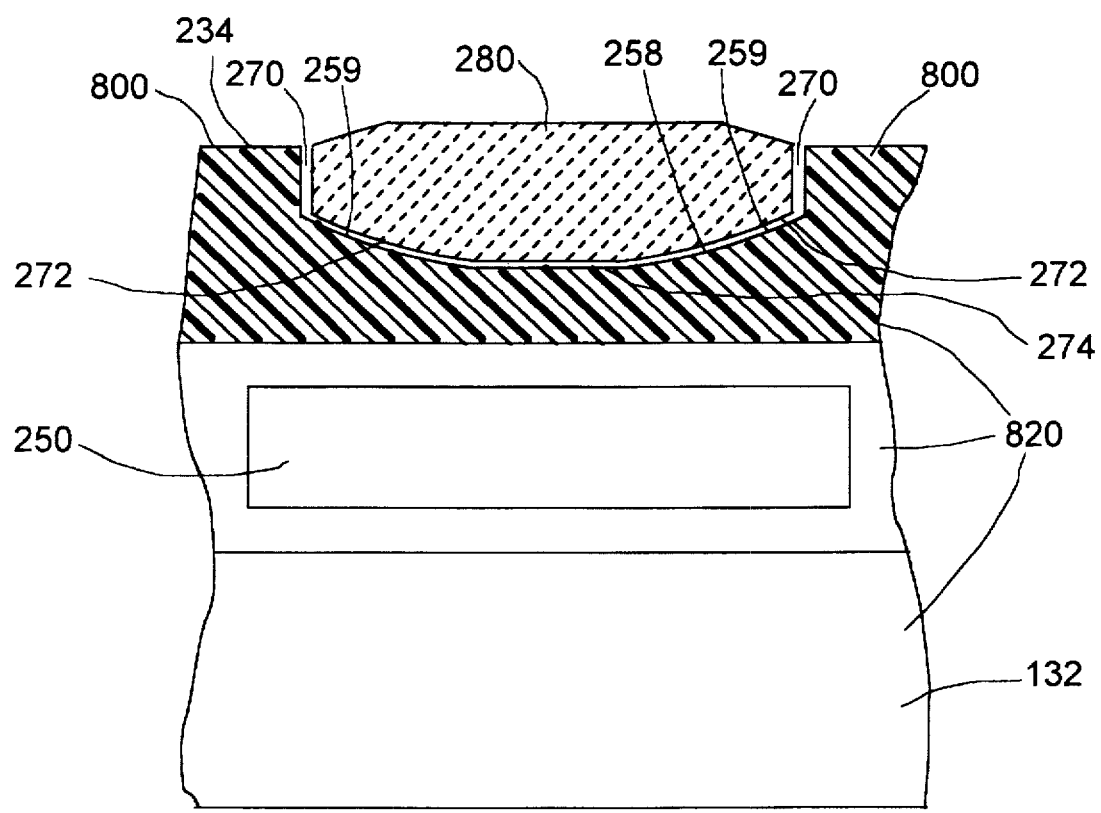
FIG. 8B is a plan view of the impeller as viewed along reference line 8B—8B of FIG. 8A.

FIG. 8A and FIG. 8B represent a third embodiment of the axial bearing-wear ring.

FIG. 8A and FIG. 8B show a variation of the pads and the recesses in the impeller 820 without the depicting the rest of the pump. Each pad 280 has a crowned second side 272 with a peak 274 toward the center of the pad 280. The crowned second side 272 is crowned longitudinally along each pad 280. The crowned second side 272 may be substantially convex or curved in other ways. The pads preferably have a curved or arched leading section 296 and a curved or arched trailing section 297, which are defined with reference to the rotational direction of the impeller 820. The pads 280 are preferably constructed from a ceramic or a plastic material.

The impeller 820 has recesses 258 with curved or crowned bottoms 259 and tilt clearances 270. The crowned bottoms 259 are concave or shaped in a way which conforms to the shape of the pads 280. The material that forms the recesses 258 is preferably a plastic, a fiber-reinforced plastic, a polymer, a fiber-reinforced polymer, or the like. Tilt clearances 270 are located adjacent to opposite sides of each pad 280. The tilt clearances 270 are selected to allow each pad 280 to individually tilt a maximum of one to two degrees from its rest position, in which the sides are vertically oriented. In an alternative embodiments, the crowned bottom could have a peak near the middle of the recess and pads with flat second sides could be used.

A front shroud 822 of the impeller 820 has an intervening portion disposed between the recesses 258. The intervening portion 234 has approximately the same maximum height as the annular projection 800. The pads 280 are raised slightly above the intervening portions 234 and the annular projection 800. An impeller outlet 250 is located in the impeller 820.

Figure 9:
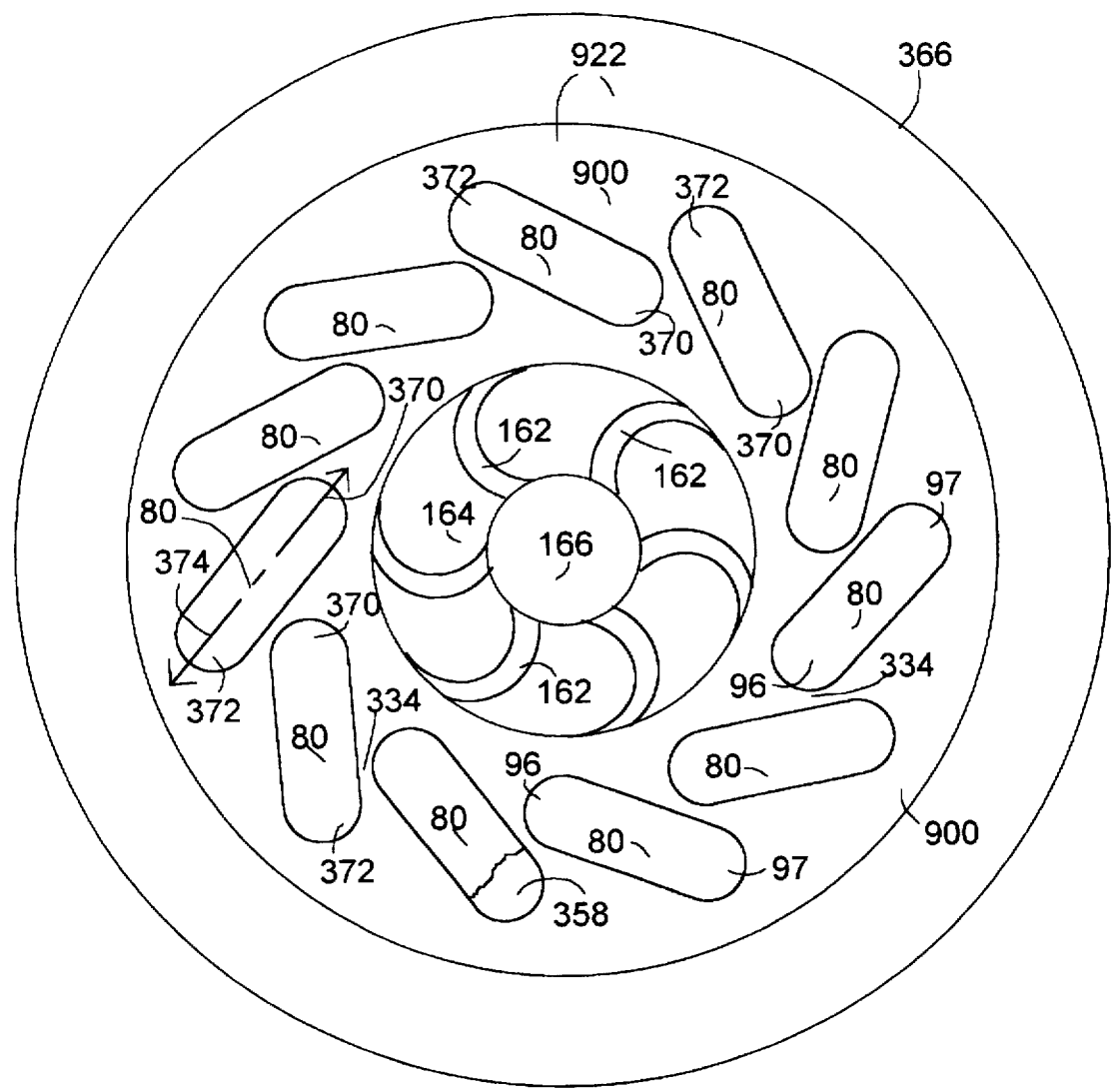
FIG. 9 is a plan view of an impeller incorporating a fourth embodiment of the axial bearing-wear ring.

FIG. 9 shows a fourth embodiment of the axial bearing-wear ring. FIG. 9 shows an impeller 920 with a variation of the orientation of the recesses 358. The recesses 358 and their corresponding pads 80 are oriented in a radially slanted manner, rather than forming a simple circular outline as shown in FIG. 8B. The impeller 920 has an annular projection 900 extending from a front shroud 922.

The pads 80 have first ends 370 and second ends 372. The slanting occurs with reference to the longitudinal centerline 374. The longitudinal centerline 374 near the first end 370 of each pad 80 is slanted toward the center of the impeller 920. Meanwhile, the longitudinal centerline 374 near the second end 372 of each pad is slanted toward the impeller periphery 366. As illustrated in FIG. 9, the slanting angle is approximately thirty degrees. If the slanting angle is too great, the pads 80 may potentially break loose from their recesses 358.

The slanted orientation of the pads 80 allows adjacent pads 80 to be offset with respect to one another. The offset orientation of the pads 80 limits the flow of fluid near the intervening portion 334 between the pads 80. When the impeller 920 is incorporated into a centrifugal pump the off-set orientation of the pads 80 contributes to the axial bearings functionality as a wear ring.

FIG. 10 shows a fifth embodiment of the axial bearing-wear ring. The front shroud 12 of the impeller 14 has an axial shroud extension 176. The axial shroud extension 176 is substantially cylindrical or substantially annular. The axial shroud extension 176 projects forward for an axial length 178 which is approximately greater than or equal to half the axial thickness of a ring 70, or axial bearing member, located in the shaft support. Typically, the axial length 178 is equal to five or ten times the radial clearance 180 between the outer edge 182 of the axial shroud extension 176 and the axial bearing member.

The axial shroud extension 176 has an outer edge 182 and an inner edge 184. The outer edge 182 extends near the axial bearing 190. The axial shroud extension 176 terminates axially at a terminating edge 188 near the pump inlet 104. The axial shroud extension 176 has a step 174 in the outer edge 182. The radial clearance 180 is measured between the outer edge 182 and the bearing member. The requisite radial clearance 180 depends upon the construction material of the impeller 14 among other factors. For example, metal pump parts only require three thousandths of an inch of for the radial clearance 180, while plastic pump parts require ten to thirty thousandths of an for the inch radial clearance 180.

A baffle 172 is optimally used in conjunction with the axial shroud extension 176. The baffle 172 extends radially inward from the first shaft support 114 or the pump housing. A gap 186 is located between the axial shroud extension 176 and the baffle 172. In a preferred embodiment, the gap 186 axially extends for approximately one-eighth of an inch.

When the pump operates a pressure differential exists between the suction head and the outlet side. A recirculation flow develops as best illustrated by the bold arrows in FIG. 10. The axial shroud extension 176 disrupts the recirculation path and prevents a radial stream from interfering with the suction flow into the impeller intake. The recirculation flow is diverted and gradually flows into the impeller intake after traversing the gap 186 and loosing radial velocity. Magnets 191 are used for electromagnetically coupling the impeller 14 to the drive motor via a drive motor coupling 146.

The foregoing detailed description is provided in sufficient detail to enable one of ordinary skill in the art to make and use the axial bearing with attributes of a wear ring. The foregoing detailed description is merely illustrative of several physical embodiments of the axial bearing or the axial bearing-wear ring. Physical variations of the axial bearing, not fully described in the specification are encompassed within the purview of the claims. Accordingly, the narrow description of the elements in the specification should be used for general guidance rather than to unduly restrict the broader description of the elements in the following claims.

I claim:

1. An axial bearing for use in a centrifugal pump comprising:

pads arranged in a curved orientation with respect to one another, each one of the pads having a first side and a second side, the first side defined by a curved leading section, a substantially rectangular middle section, and a curved trailing section, the pads constructed from a ceramic material;

a ring having a first face positioned adjacent to the first side of each pad;

a base associated with the pads, the base being constructed from a first material and a second material; the first material being capable of flexing in response to a change in axial loads on the base; the second material reinforcing the first material; and retaining means for retaining the pads under compressive forces with respect to the base, the pads interlocking with said retaining means, the compressive forces radially extending with reference to the pads, the radially extending compressive forces being generated through an elastic expansion of the retaining means in response to interlocking the pads with the retaining means, the pads exceeding a pre-interlocking dimension of the retaining means by an interference dimension, the pads being individually retained with respect to the base, said base and the retaining means orienting the first side of each pad substantially parallel to the first face.

2. The bearing of claim 1 wherein said retaining means comprises recesses with recess shapes that complement corresponding pad shapes; each one of the recesses containing the second side of one of the pads, the recesses frictionally retaining the pads, and the recesses partially encapsulating the pads by partially or substantially surrounding the pads in two dimensions out of three dimensions.

3. The bearing of claim 1 wherein said retaining means comprises a series of pockets, the pockets having first interlocking cross sections that complement second interlocking cross sections of corresponding pads; the first interlocking cross sections and the second interlocking cross sections being united to retain the pads.

4. The bearing of claim 3 wherein the pockets are separated by intervening portions, the intervening portions extending axially from a base face of the base, the intervening portions having an elevation extending from the said base face in an amount less than pad heights of adjacent ones of the pads.

5. The bearing of claim 4 wherein an axial clearance dimension between the intervening portions and the ring is minimized by extending the elevation of the intervening portions to substantially equal the pad heights of the adjacent pads, the curved orientation of the pads and intervening portions collectively forming a substantially annular area of uniform axial height.

6. The bearing of claim 1 wherein the first material is selected from the group consisting of plastics and polymers.

7. The bearing of claim 1 wherein the retaining means comprises a substantially annular recess partially filled with a resilient material, the resilient material surrounding a curved protrusion extending from each of said pads and operably anchoring the pads to the base.

8. The bearing of claim 1 wherein the ceramic material is selected from the group consisting of silicon carbide, tungsten carbide, alumina, bauxite, and zirconia.

9. The bearing of claim 1 wherein the middle section is substantially rectangular; a pad height of each pad varying from the curved leading section to the rectangular middle section, the pad height of each pad being lowest at the curved leading section and extending gradually upward toward a peak height at the rectangular middle section, the curved leading section and the curved trailing section being semi-circular or semi-elliptical when viewed from the first side.

10. The bearing of claim 1 wherein the middle section is substantially rectangular; a pad height of each pad varying from the curved leading section to the rectangular middle section, the pad height of each pad being lowest at the curved leading section and the curved trailing section; the pad height being highest at the rectangular middle section, the curved leading section and the curved trailing section being semi-circular or semi-elliptical when viewed from the first side.

11. The bearing of claim 1 wherein the second material comprises a reinforcement selected from the group consisting of fiber reinforcements, composite reinforcements, and laminate reinforcements.

12. The bearing of claim 1 wherein a combination of the first material and the second material comprises an aggregate material selected from the group consisting of plastic composites, fiber-reinforced plastics, plastic laminates, and polymer composites.

13. The bearing of claim 1 wherein the first material comprises a plastic with a first modulus of elasticity and wherein the ceramic material has a second modulus of elasticity, the first modulus of elasticity being greater than the second modulus of elasticity.

14. The bearing of claim 1 wherein the retaining means comprises recesses associated with corresponding resilient members, the resilient members backing said pads, the resilient members having a resilience biased against angular misalignment, said resilience opposing compressive forces in the axial direction.

15. The bearing of claim 1 wherein the interference dimension equals or is less than five thousandths of an inch.

16. The bearing of claim 1 wherein said pads include a fractured pad, said fractured pad being retained by said retaining means and axial forces acting upon the axial bearing.

17. The bearing of claim 1 wherein the first side is substantially elliptical.

18. An axial bearing for use in a centrifugal pump comprising:
- pads arranged in a curved orientation with respect to one another, each one of the pads having a first side and a second side;
- a ring having a first face positioned adjacent to the first side of each pad;
- a base associated with the pads, the base being constructed from a first material and a second material; the first material being capable of flexing in response to a change in axial loads on the base; the second material reinforcing the first material; and
- retaining means for retaining the pads with respect to the base, the pads interlocking with said retaining means, the pads being individually retained with respect to the base, the retaining means including walls that restrict radial movement of the pads with respect to said base; said base and the retaining means orienting the first side of each pad substantially parallel to the first face, the retaining means comprising a substantially annular recess, the pads being at least partially disposed within the substantially annular recess, the substantially annular recess having a bottom and anchoring recesses; the anchoring recesses extending downward from the bottom, the pads having anchoring protrusions conforming in size and shape to the anchoring recesses, the anchoring protrusions inserted into the anchoring recesses to prevent rotational movement of said pads within the substantially annular recess.

19. The bearing of claim 18 wherein the anchoring recesses and the anchoring protrusions are polyhedral.

20. An axial bearing for use in a centrifugal pump comprising:
- pads arranged in a curved orientation with respect to one another, each one of the pads having a first side and a second side;
- a ring having a first face positioned adjacent to the first side of each pad;
- a base associated with the pads, the base being constructed from a first material and a second material; the first material being capable of flexing in response to a change in axial loads on the base; the second material reinforcing the first material; and
- retaining means for retaining the pads with respect to the base, the pads interlocking with said retaining means, the pads being individually retained with respect to the base, the retaining means including walls that restrict radial movement of the pads with respect to said base; said base and the retaining means orienting the first side of each pad substantially parallel to the first face, said retaining means comprising a substantially annular recess, the plurality of pads being disposed within the substantially annular recess, the substantially annular recess including islands, a bottom, and said walls; the islands extending from the bottom, the islands preventing rotational movement of the pads within the substantially annular recess.

21. A centrifugal pump having an impeller and a shaft, wherein the improvement comprises:
- an axial bearing, the axial bearing associated with the impeller, the axial bearing coaxially disposed around the shaft, the axial bearing including pads, a ring, and retaining means for retaining the pads; the pads having first sides and second sides; the ring having a face oriented adjacent to the first sides; the second sides frictionally interlocking with said retaining means.

22. The centrifugal pump of claim 21 wherein said retaining means comprises a substantially annular recess in the impeller.

23. The centrifugal pump of claim 21 wherein said retaining means comprises a series of pockets in a front shroud of the impeller, the retaining means having first interlocking cross sections, the pads having second interlocking cross sections, the first interlocking cross sections corresponding in shape and size to the second interlocking cross sections, the first interlocking cross sections and the second interlocking cross sections being interlocked.

24. The centrifugal pump of claim 21 wherein said retaining means are associated with a resilient material, the resilient material interposed between the pads and said retaining means, and wherein said resilient material dampens axial movement of the impeller.

25. The centrifugal pump of claim 21 wherein the pads have pad heights and wherein the pad heights are gradually tapered.

26. The centrifugal pump of claim 21 wherein the first side of each said pads has a shape selected from the group consisting of a pie shape, an arched shape, a circular shape, a polygonal shape, an oval shape, an elliptical shape, a rectangular shape, a rectangular shape with rounded edges, and a rectangular shape with arches on opposing sides.

27. The centrifugal pump of claim 21 wherein the impeller is partially or entirely made from a plastic with a first modulus of elasticity and wherein the pads are made from a ceramic material having a second modulus of elasticity, the plastic supporting the ceramic material such that the impeller flexes to dampen axial load changes.

28. The centrifugal pump of claim 21 wherein the impeller is partially or entirely made from a polymer with a first modulus of elasticity and wherein the pads are made from a ceramic material having a second modulus of elasticity, the polymer supporting the ceramic material such that the impeller flexes to dampen axial load changes.

29. A centrifugal pump having an impeller and a shaft, wherein the improvement comprises:
- an axial bearing, the axial bearing associated with the impeller, the axial bearing coaxially disposed around the shaft, the axial bearing including pads, a ring, and retaining means for retaining the pads; the pads having first sides and second sides; the ring having a face oriented adjacent to the first sides; the second sides frictionally interlocking with said retaining means; said retaining means comprising a series of pockets in a front shroud of the impeller, the pockets having substantially crowned, or peaked, bottoms; the second sides curved to conform in shape and size to the substantially crowned bottoms.

30. The centrifugal pump of claim 29 wherein each pocket has tilt clearances located near two, opposite pad ends of each pad, the tilt clearances being selected to permit each pad to tilt a maximum angle between one degree and two degrees from a rest position in which the pad end is substantially vertical.

31. A centrifugal pump having an impeller and a shaft, wherein the improvement comprises:
- an axial bearing, the axial bearing associated with the impeller, the axial bearing coaxially disposed around the shaft, the axial bearing including pads, a ring, and retaining means for retaining the pads; the pads having first sides and second sides; the ring having a face oriented adjacent to the first sides; the second sides frictionally interlocking with said retaining means; said retaining means comprising a series of pockets in a front shroud of the impeller, the pockets having substantially concave bottoms; the second sides being substantially convex, the concave bottoms conforming in shape and size to the second sides.

32. The centrifugal pump of claim 31 wherein the impeller is partially made from a plastic with a first modulus of elasticity and wherein the pads are made from a ceramic material having a second modulus of elasticity, the plastic supporting the ceramic material such that the impeller can flex in response to axial load changes.

33. The centrifugal pump of claim 31 wherein the impeller is partially made from a polymer with a first modulus of elasticity and wherein the pads are made from a ceramic material having a second modulus of elasticity, the polymer supporting the ceramic material such that the impeller can flex in response to axial load changes.

34. A centrifugal pump having an impeller and a shaft, wherein the improvement comprises:
an axial bearing, the axial bearing associated with the impeller, the axial bearing coaxially disposed around the shaft, the axial bearing including pads, a ring, and retaining means for retaining the pads; the pads having first sides and second sides; the ring having a face oriented adjacent to the first sides; the second sides frictionally interlocking with said retaining means; said retaining means comprising a series of pockets, the pockets having substantially flat bottoms, and the second sides of the pads being substantially flat.

35. The centrifugal pump of claim 34 wherein the impeller is partially made from a plastic with a first modulus of elasticity and wherein the pads are made from a ceramic material having a second modulus of elasticity, the plastic supporting the ceramic material so that the impeller can flex in response to axial load changes.

36. The centrifugal pump of claim 34 wherein the impeller is partially made from a polymer with a first modulus of elasticity and wherein the pads are made from a ceramic material having a second modulus of elasticity, the polymer supporting the ceramic material so that the impeller can flex in response to axial load changes.

37. The centrifugal pump according to claim 34 wherein the pockets and the corresponding pads meet at a plurality of peripheral contact points, pad dimensions of the pads exceeding pre-interlocking pocket dimensions of the respective pockets at the peripheral contact points.

38. The centrifugal pump according to claim 34 wherein the pads have curved leading sections, middle sections, and curved trailing sections.

39. The centrifugal pump according to claim 38 wherein the middle sections are substantially rectangular, and wherein the curved leading sections and the curved trailing sections are substantially arched.

40. The centrifugal pump according to claim 39 wherein pad heights of said pads vary from the curved leading sections to the middle sections, the pad heights being lowest at the curved leading sections and the curved trailing sections; the pad heights being highest at the middle sections, the curved leading sections and the curved trailing sections being arched when viewed from the first sides.

41. A centrifugal pump comprising
a housing having a housing cavity, an inlet, and an outlet;
a shaft located in the housing cavity;
a radial bearing coaxially surrounding said shaft, the shaft and the radial bearing being rotatable with respect to one another;
an impeller positioned to receive a fluid from the inlet and to exhaust a fluid to the outlet, the impeller cooperating with the shaft;
an axial bearing coaxially located around said shaft, the axial bearing being associated with said impeller, the axial bearing having pads, a ring, and retaining means for retaining the pads; each of said pads having a first side and a second side; the ring having a first face, the first face being located adjacent to the first side of each pad; retaining means for retaining said pads restricting the radial movement of said pads, the second side of each pad disposed within said retaining means, said pads interlocking with said retaining means, the first side of each of said pads oriented substantially parallel to the first face.

42. The centrifugal pump of claim 41 wherein the shaft is stationary with respect to the housing; wherein the impeller rotates around the shaft; and wherein the retaining means comprises a substantially annular recess located in a front shroud of the impeller.

43. The centrifugal pump of claim 41 wherein said retaining means comprises a set of pockets located within a front shroud of the impeller and wherein said pads are frictionally restricted in movement relative to said impeller by said pockets.

44. The centrifugal pump of claim 41 wherein said retaining means comprises a substantially annular recess with anchoring recesses located within a front shroud of the impeller, said pads having anchoring protrusions, the pads being frictionally restricted in movement relative to said impeller by interlocking of the anchoring recesses with the anchoring protrusions.

45. The centrifugal pump of claim 41 wherein the retaining means comprises a substantially annular recess located within said housing.

46. The centrifugal pump of claim 41 wherein said retaining means is associated with a resilient member and wherein said resilient member dampens axial movement of the impeller.

47. The centrifugal pump of claim 41 wherein each pad has a pad height and wherein the pad height is gradually tapered.

48. The centrifugal pump according to claim 41 wherein the retaining means and the pads meet at a plurality of peripheral contact points, pad dimensions of the pads exceeding pre-interlocking dimensions of the retaining means at the peripheral contact points.

49. The centrifugal pump according to claim 41 wherein the pads have curved leading sections, middle sections, and curved trailing sections.

50. The centrifugal pump according to claim 49 wherein the middle sections are substantially rectangular, and wherein the curved leading sections and the curved trailing sections are substantially arched.

51. A centrifugal pump comprising:
a housing having a housing cavity, an inlet, and an outlet;
a shaft located in the housing cavity;
a radial bearing coaxially surrounding said shaft, the shaft and the radial bearing being rotatable with respect to one another;
an impeller positioned to receive a fluid from the inlet and to exhaust a fluid to the outlet, the impeller cooperating with the shaft;
an axial bearing coaxially located around said shaft, the axial bearing being associated with said impeller, the axial bearing having pads, a ring, and retaining means for retaining the pads; each of said pads having a first side and a second side; the ring having a first face; the first face being located adjacent to the first side of each pad; retaining means for retaining said pads restricting the radial movement of said pads, the second side of each pad disposed within said retaining means, said pads interlocking with said retaining means, the first side of each of said pads oriented substantially parallel to the first face the impeller having a front shroud; said retaining means comprising a set of pockets located in the front shroud; the pockets being arranged at an offset angle with respect to an imaginary circle which is concentric with an impeller periphery of the impeller.

52. The centrifugal pump according to claim 51 wherein the pads have curved leading sections, middle sections, and curved trailing sections.

53. A centrifugal pump comprising:

a housing having a housing cavity, an inlet, and an outlet;

a shaft located in the housing cavity;

a radial bearing coaxially surrounding said shaft, the shaft and the radial bearing being rotatable with respect to one another;

an impeller positioned to receive a fluid from the inlet and to exhaust a fluid to the outlet, the impeller cooperating with the shaft;

an axial bearing coaxially located around said shaft, the axial bearing being associated with said impeller, the axial bearing having pads, a ring, and retaining means for retaining the pads; each of said pads having a first side and a second side; the ring having a first face; the first face being located adjacent to the first side of each pad; retaining means for retaining said pads restricting the radial movement of said pads, the second side of each pad disposed within said retaining means, said pads interlocking with said retaining means, the first side of each of said pads oriented substantially parallel to the first face the impeller having a front shroud; the pads having longitudinal centerlines, first ends and second ends; the longitudinal centerlines at the first ends of the pads facing radially outward while the longitudinal centerline at the second ends of the pads facing radially inward.

54. The centrifugal pump of claim 53 wherein the pads include a first pad and an adjacent, second pad; the first end of the first pad being staggered with respect to the second end of the adjacent, second pad such that if an imaginary radial line were drawn outward from an impeller center, the imaginary radial line would intersect with the both the first pad and the adjacent, second pad.

55. The centrifugal pump according to claim 53 wherein the pads have curved leading sections, middle sections, and curved trailing sections.

56. A centrifugal pump comprising:

a housing having a housing cavity, an inlet, and an outlet;

a shaft located in the housing cavity;

a radial bearing coaxially surrounding said shaft, the shaft and the radial bearing being rotatable with respect to one another;

an impeller positioned to receive a fluid from the inlet and to exhaust a fluid to the outlet, the impeller cooperating with the shaft;

an axial bearing coaxially located around said shaft, the axial bearing being located axially adjacent to said impeller, the axial beading having pads, a ring, and retaining means for retaining the pads: each of said pads having a first side and a second side; the ring having a first face, the first face being located adjacent to the first side of each pad; retaining means for retaining said pads restricting the radial movement of said pads within the housing cavity, the second side of each pad disposed within said retaining means, said pads interlocking with said retaining means, the first side of each of said pads oriented substantially parallel to the first face, the impeller having a front shroud with a substantially annular shroud extension axially extending from the front shroud.

57. The centrifugal pump of claim 56 wherein the substantially annular shroud extension axially extends an axial distance greater than or equal to half the axial thickness of the ring.

58. The centrifugal pump of claim 56 wherein a baffle extends radially inward from the housing cavity near a terminating edge of the annular shroud extension.

59. The centrifugal pump of claim 58 wherein an axial clearance between the baffle and the annular shroud extension is approximately one-eight of an inch; and wherein the radial clearance between an outer edge of the annular shroud extension and the axial bearing is approximately twenty to thirty thousandths of an inch.

60. The centrifugal pump according to claim 56 wherein the pads have curved leading sections, middle sections, and curved trailing sections.

61. The centrifugal pump according to claim 60 wherein pad heights of said pads vary from the curved leading sections to the middle sections, the pad heights being lowest at the curved leading sections and the curved trailing sections; the pad heights being highest at the middle sections, the curved leading sections and the curved trailing sections being arched when viewed from the first sides of said pads.

62. The centrifugal pump according to claim 56 wherein the retaining means and the pads meet at a plurality of peripheral contact points, pad dimensions of the pads exceeding pre-interlocking dimensions of the retaining means at the peripheral contact points.

* * * * *